(12) United States Patent
Baertschi et al.

(10) Patent No.: US 8,382,208 B2
(45) Date of Patent: Feb. 26, 2013

(54) HANDLE FOR A BRUSH, IN PARTICULAR A TOOTHBRUSH

(75) Inventors: Armin Baertschi, Winznau (CH);
Martin Zwimpfer, Lucerne (CH);
Christian Hilfiker, Triengen (CH)

(73) Assignee: Trisa Holding, Agtriengen (CH)

( * ) Notice: Subject to any disclaimer, the term of this patent is extended or adjusted under 35 U.S.C. 154(b) by 1363 days.

(21) Appl. No.: 11/992,100

(22) PCT Filed: Aug. 28, 2006

(86) PCT No.: PCT/CH2006/000464
§ 371 (c)(1),
(2), (4) Date: Apr. 4, 2008

(87) PCT Pub. No.: WO2007/030958
PCT Pub. Date: Mar. 22, 2007

(65) Prior Publication Data
US 2009/0158540 A1 Jun. 25, 2009

(30) Foreign Application Priority Data

Sep. 16, 2005 (EP) .................................. 05020182
Feb. 8, 2006 (CH) ........................................ 198/06

(51) Int. Cl.
*A46B 5/02* (2006.01)
*A46B 9/04* (2006.01)
*A46D 3/00* (2006.01)

(52) U.S. Cl. .......................... 300/21; 15/143.1; 15/167.1
(58) Field of Classification Search ................. 15/143.1, 15/167.1; 300/21
See application file for complete search history.

(56) References Cited

U.S. PATENT DOCUMENTS

| 1,653,002 | A | * | 12/1927 | Coleman | ..................... 15/143.1 |
| 5,052,071 | A | | 10/1991 | Halm | |
| 6,464,920 | B1 | * | 10/2002 | Kramer | ......................... 264/243 |
| 6,687,940 | B1 | | 2/2004 | Gross et al. | |
| 6,742,215 | B2 | * | 6/2004 | Panfili et al. | ............... 15/236.01 |

FOREIGN PATENT DOCUMENTS

| DE | 89 03 911 U1 | 5/1989 |
| WO | WO 00/21405 | 4/2000 |
| WO | WO 01/70590 A1 | 9/2001 |

* cited by examiner

Primary Examiner — Randall Chin
(74) Attorney, Agent, or Firm — Oliff & Berridge, PLC

(57) ABSTRACT

The inventive handle for a brush, in particular for a toothbrush or a domestic brush, has an integral handle body with a hollow space which is surrounded by a wall. Recesses which are offset in relation to one another and open into the hollow space are formed in the wall. The handle is produced from a plastic in an injection-molding process using an injection-molding die which has finger elements, with sections of these finger elements touching in a sealing manner when the injection-molding die is in the closed state and, as a result, these finger elements forming the recesses and the hollow space in the hardened handle.

34 Claims, 12 Drawing Sheets

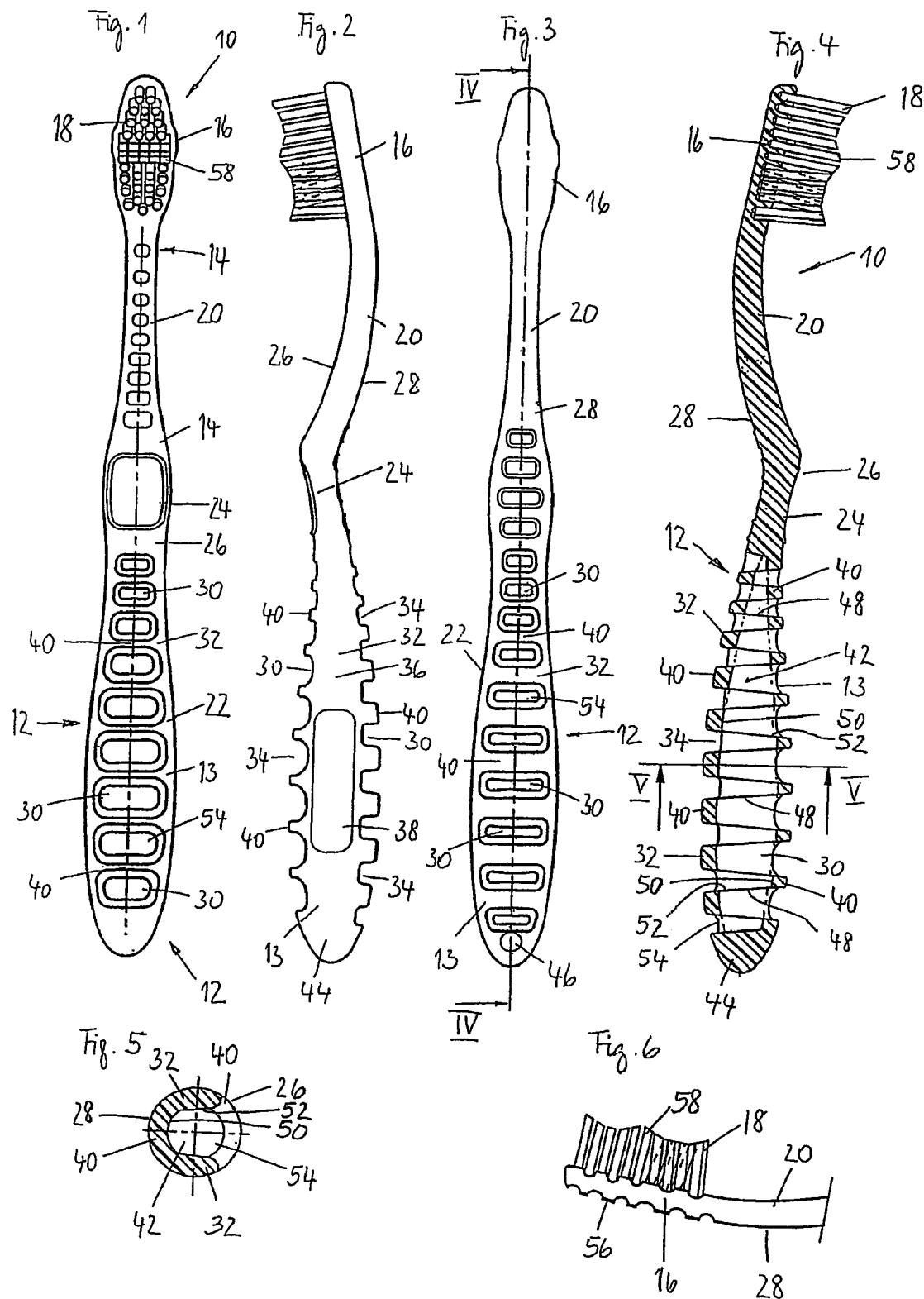

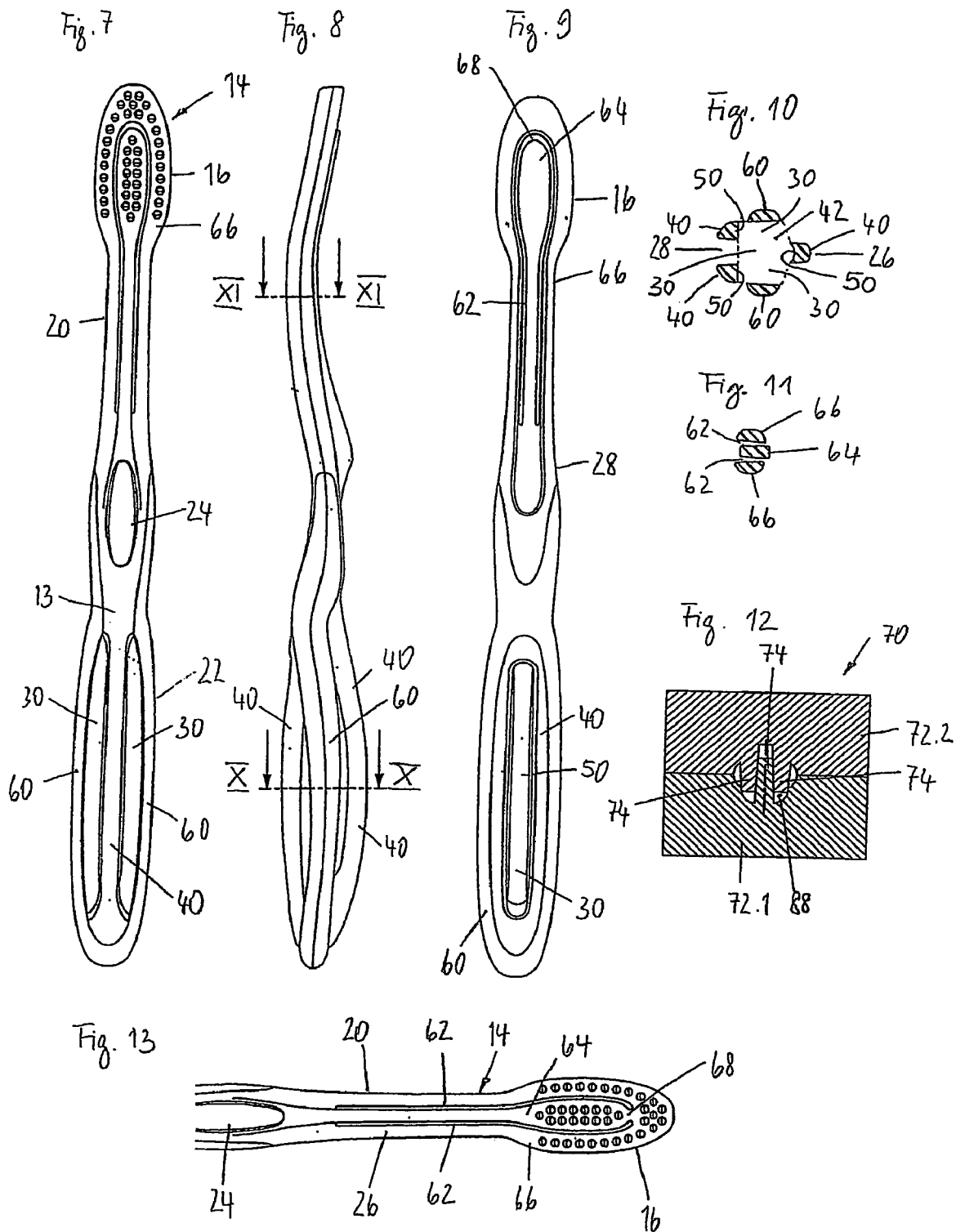

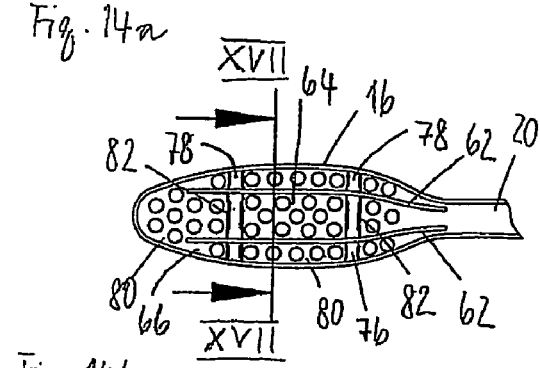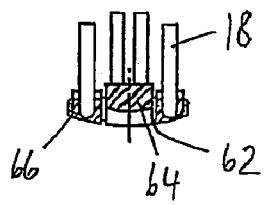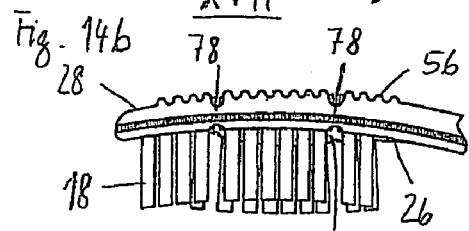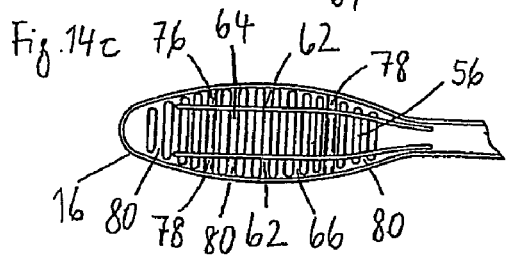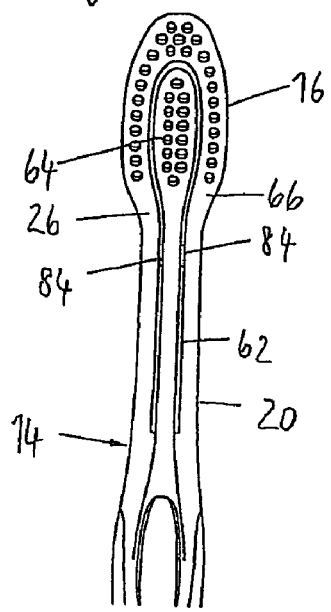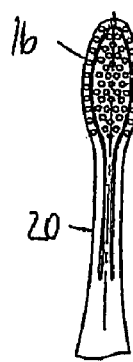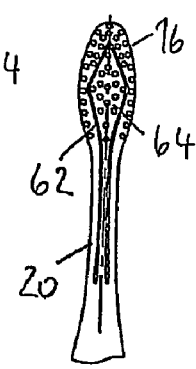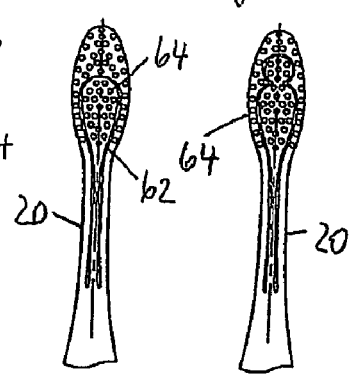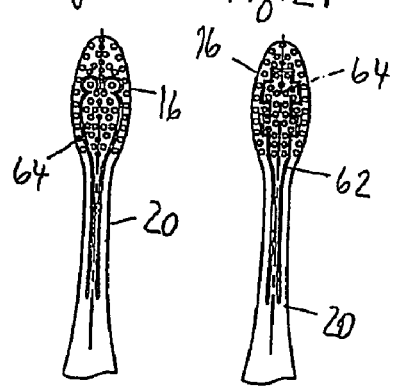

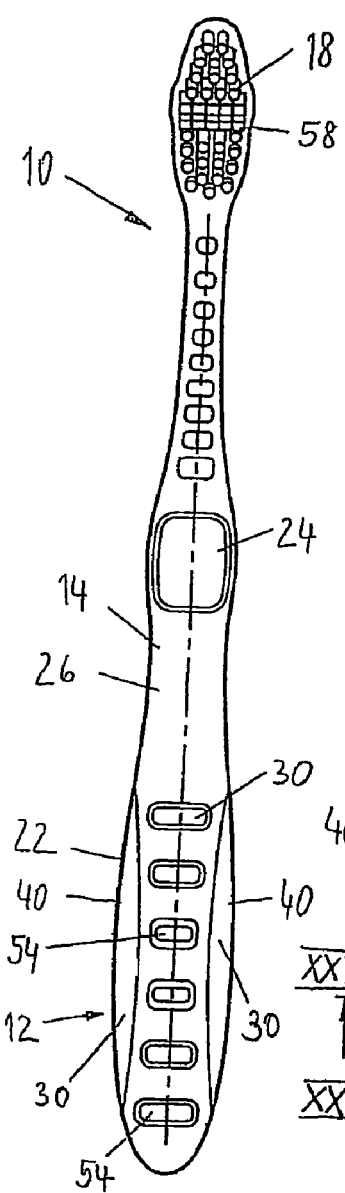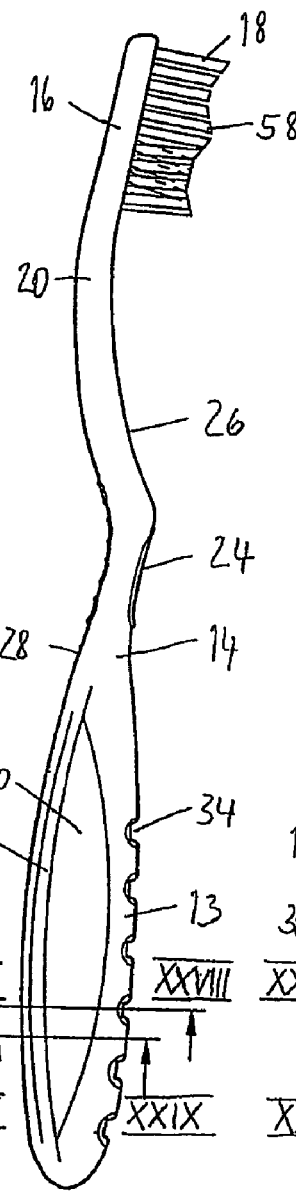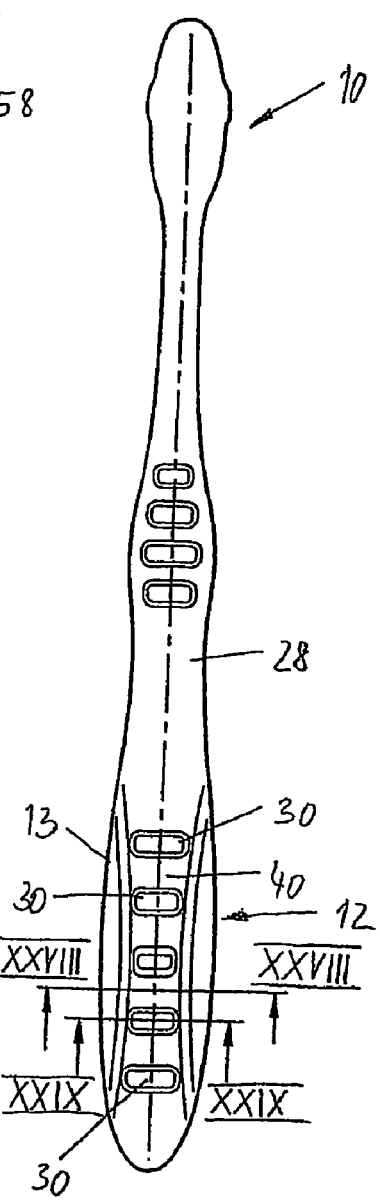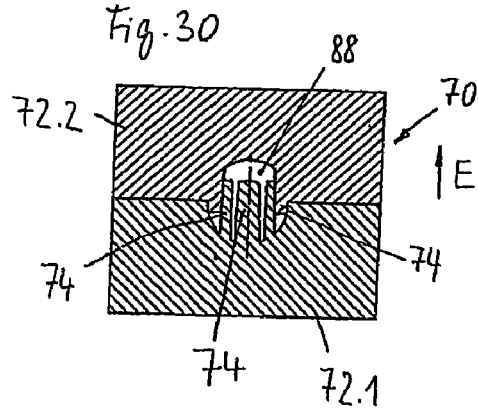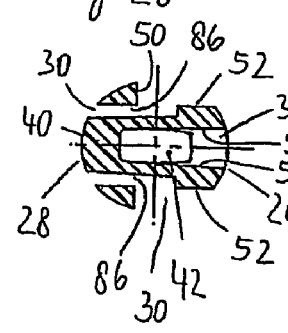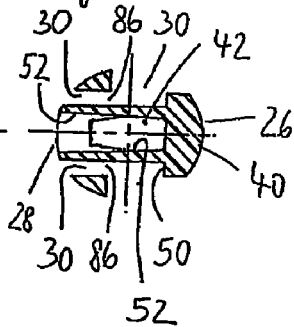

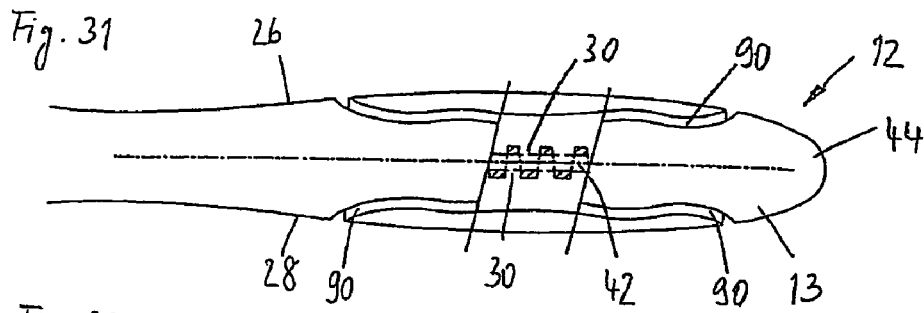
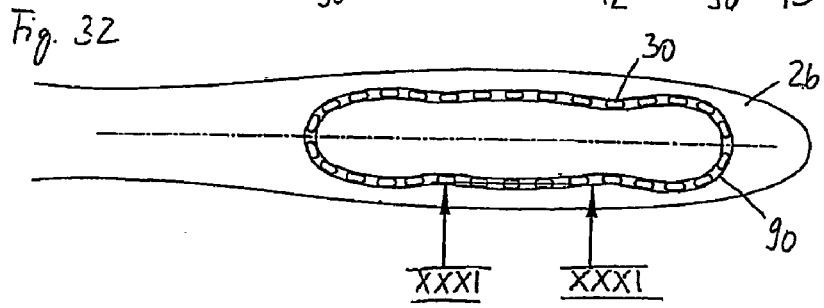
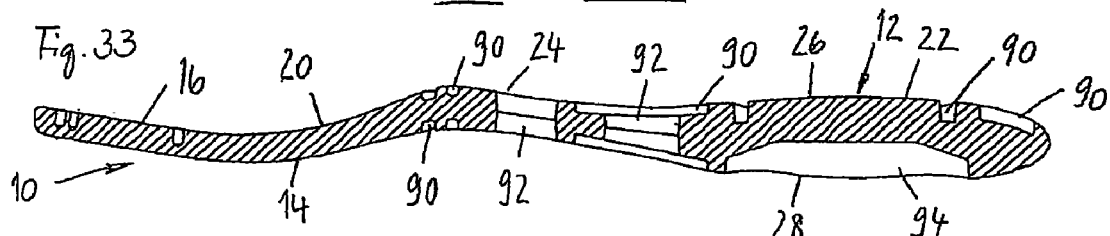
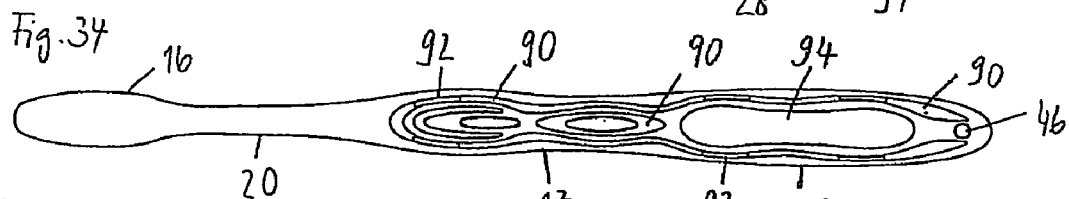
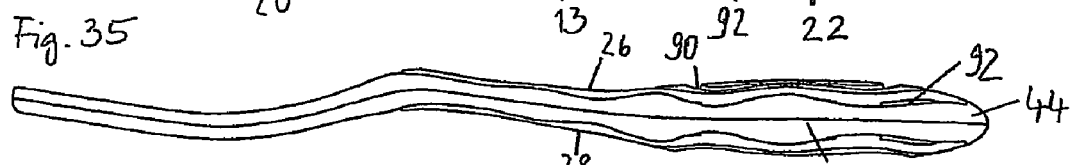
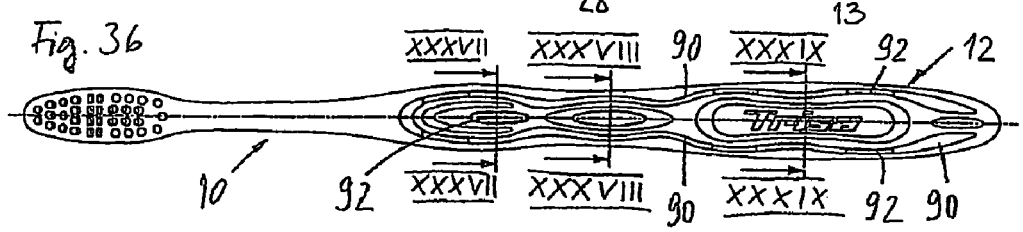
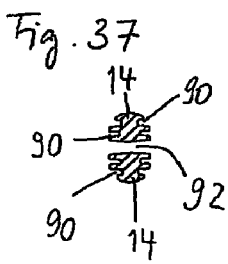
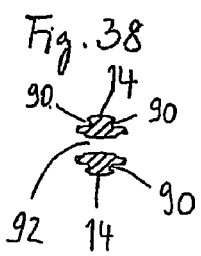
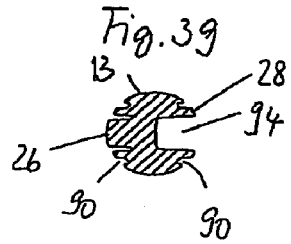

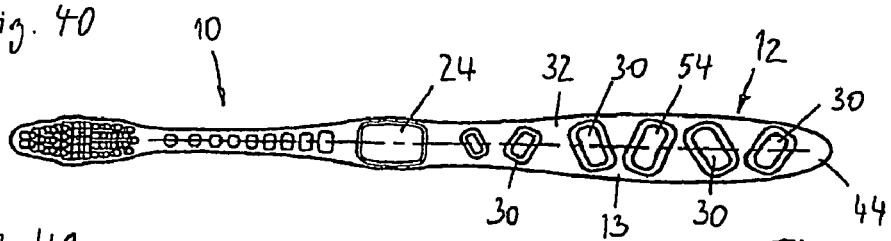
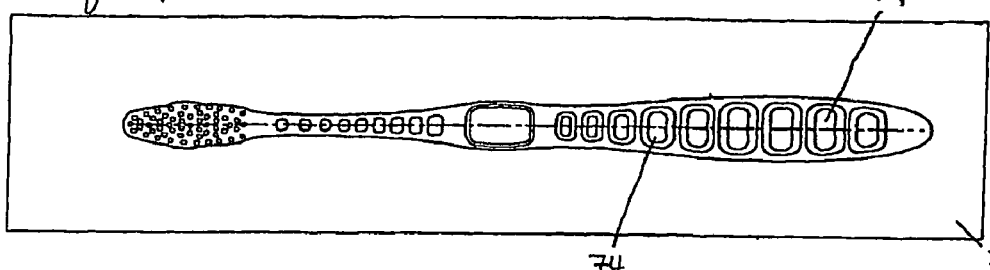
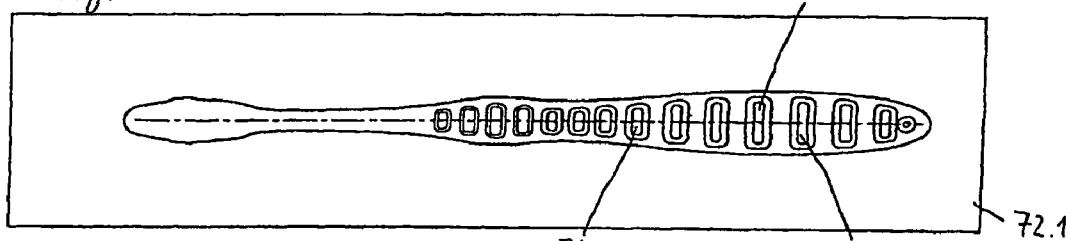
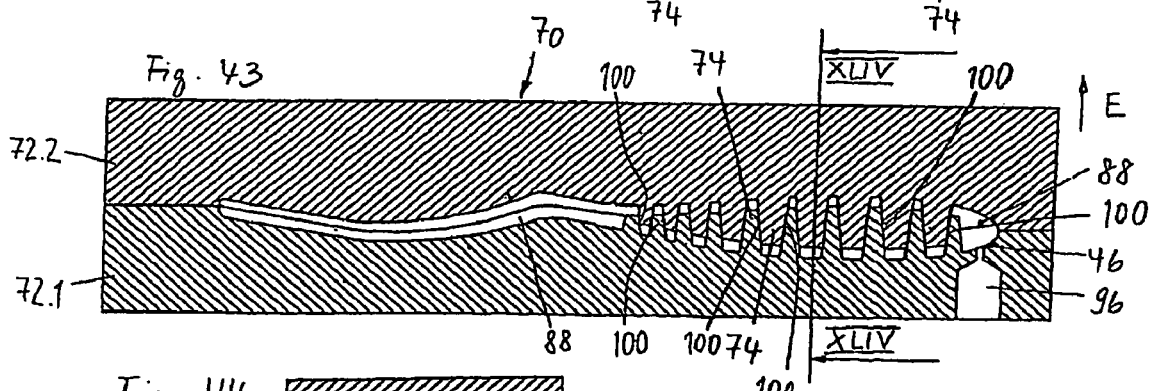
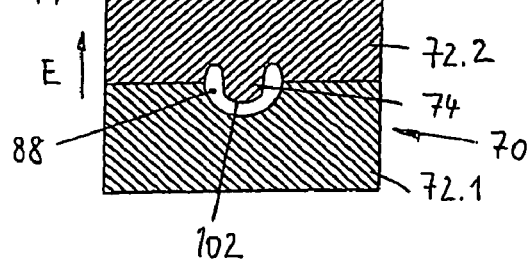

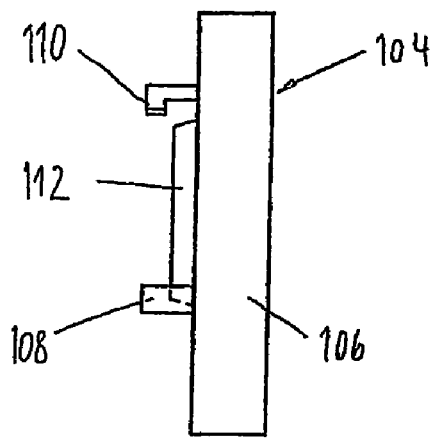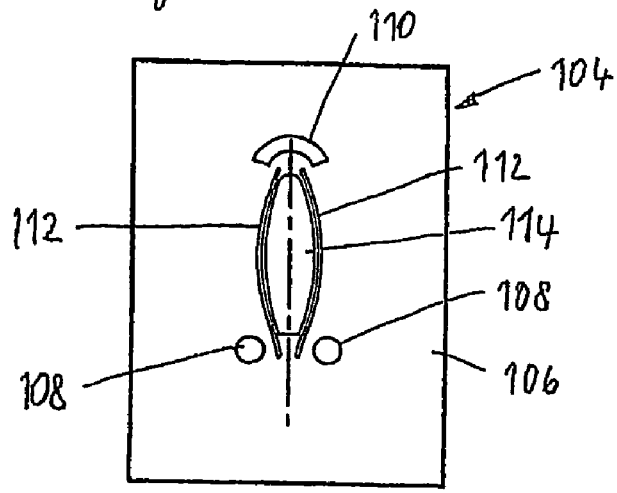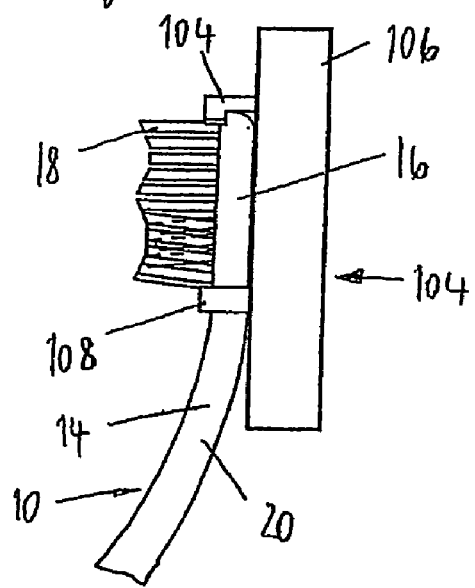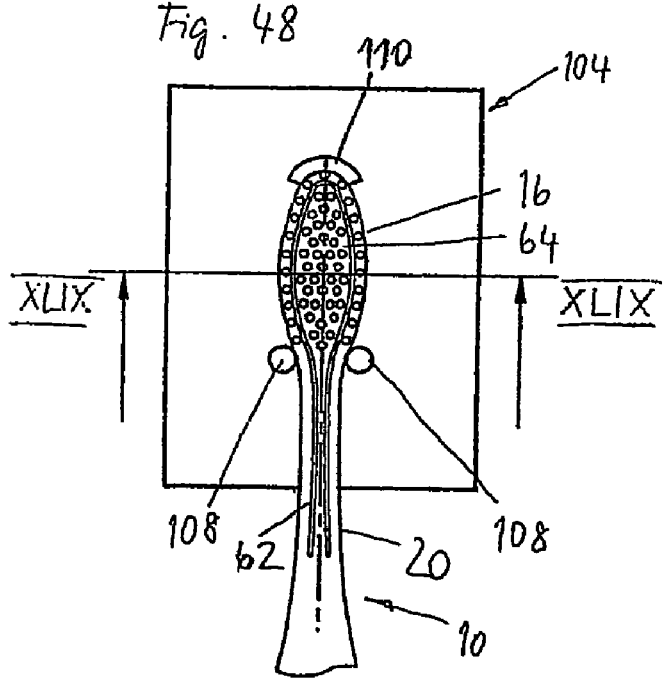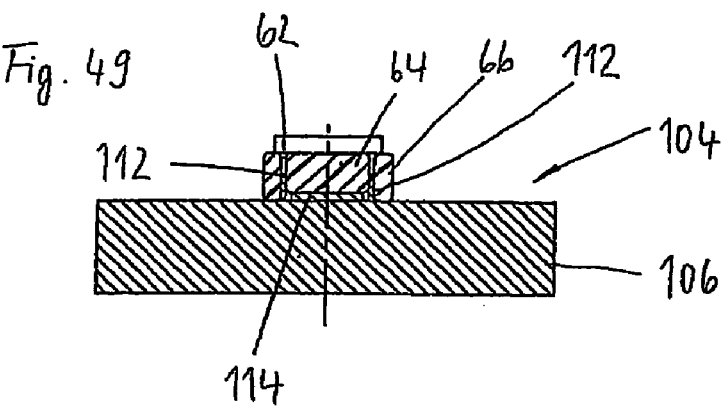

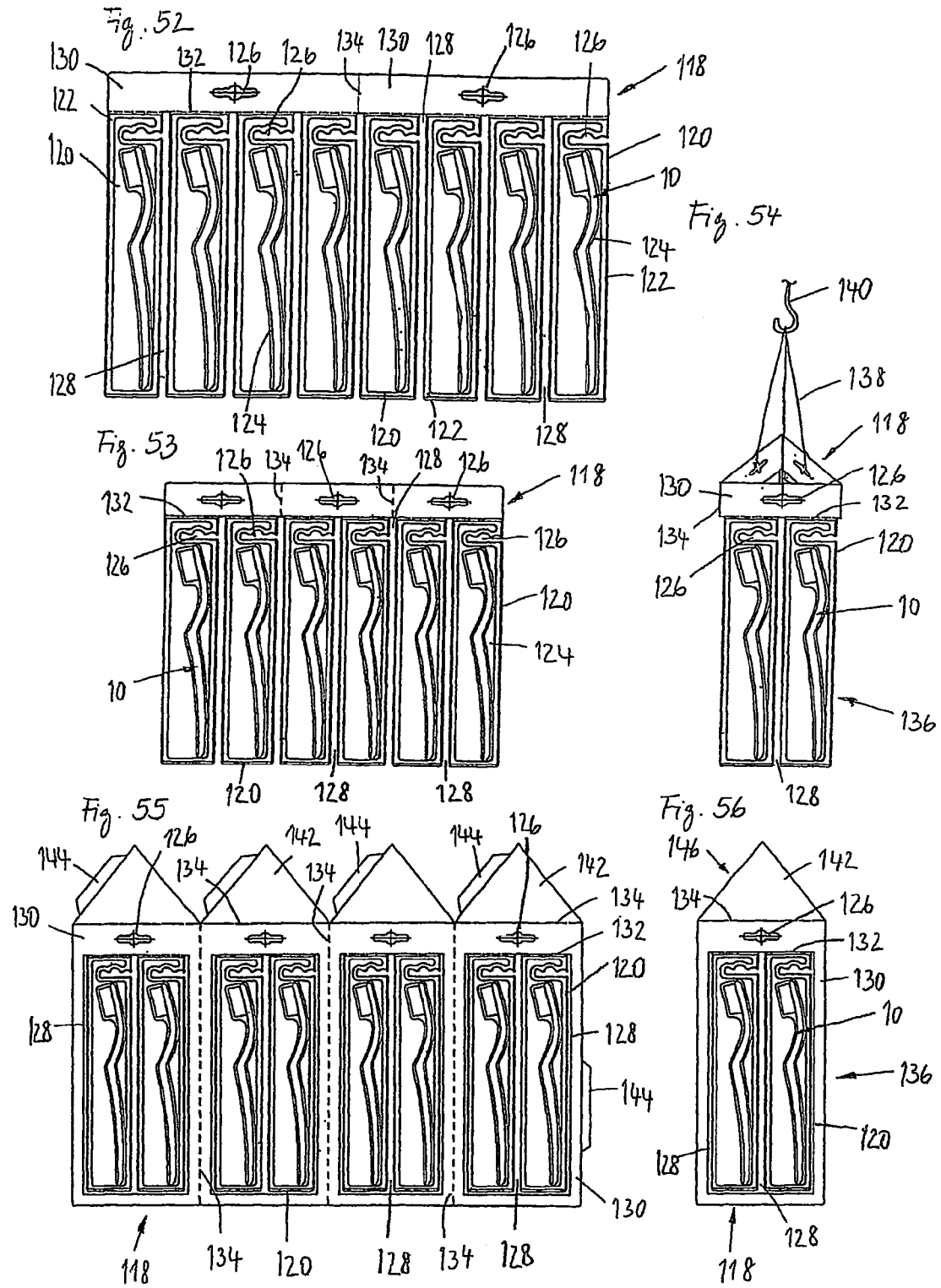

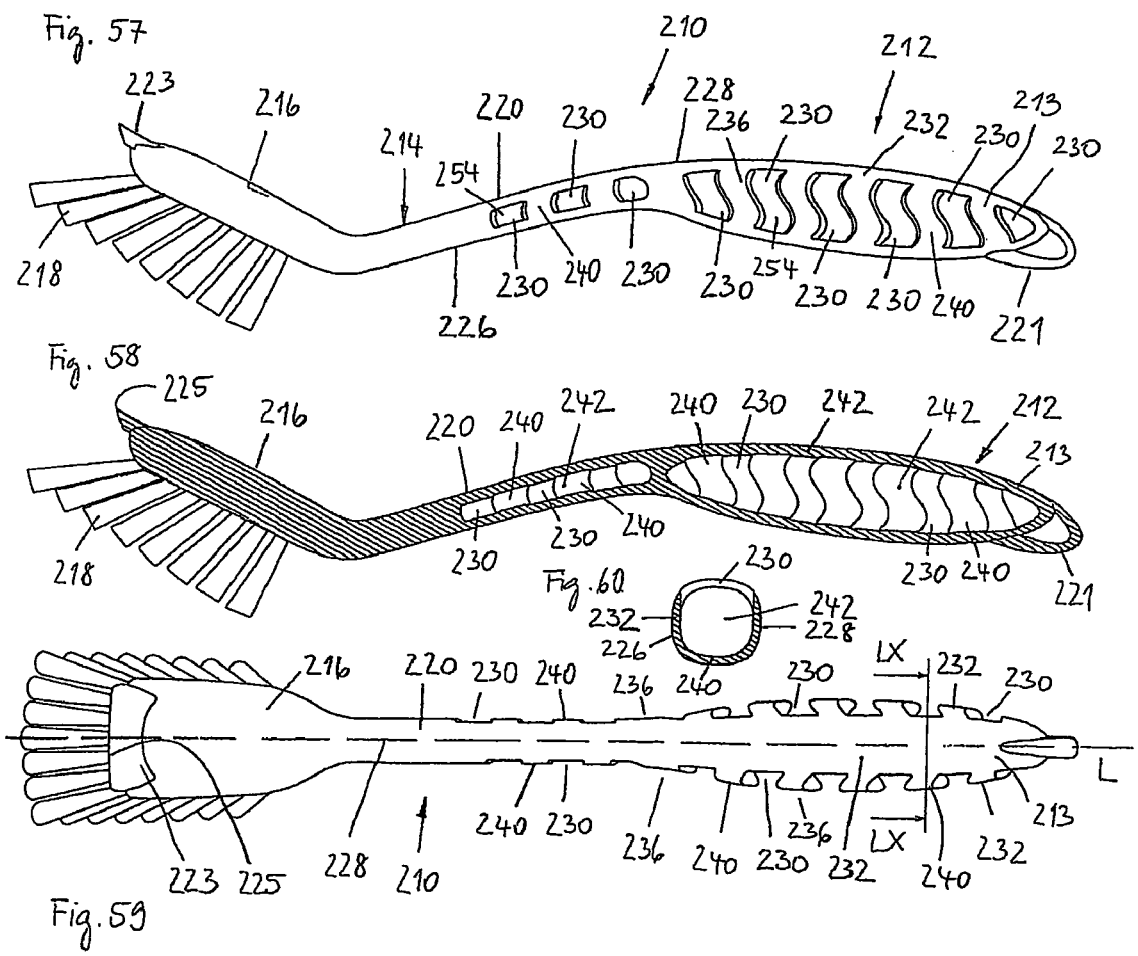

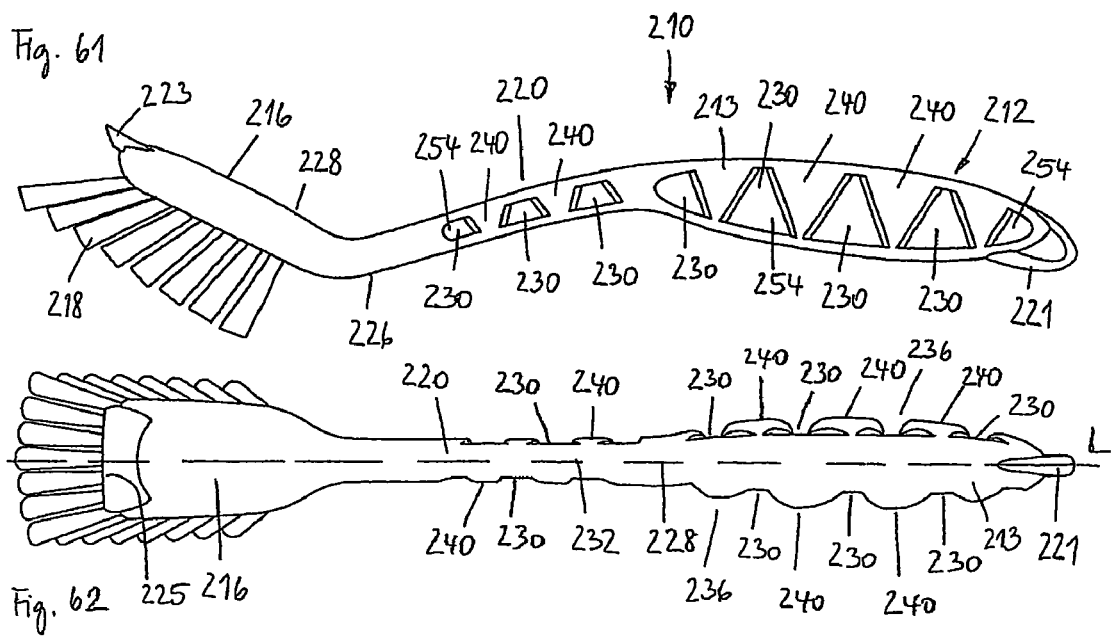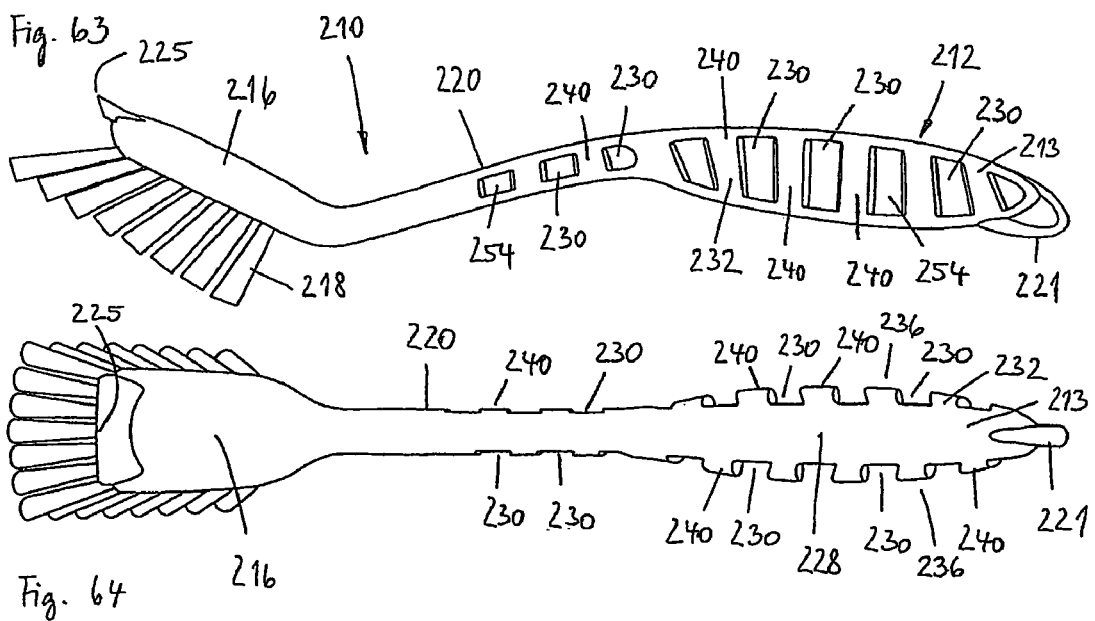

HANDLE FOR A BRUSH, IN PARTICULAR A TOOTHBRUSH

The present invention relates to a handle for a brush product, to a handle for a toothbrush, to a handle for a household brush, to a household brush with such a handle, to a method of producing the handle for a toothbrush, to a method of producing the handle for a household brush and to a method of producing a brush, in particular a toothbrush.

Handles are generally known items which generally serve for the improved handling of brushes and body-care articles, in particular toothbrushes.

A toothbrush with a handle is described, for example, in EP-B-1119272. The handle here is designed as a two-part hollow body and, for this purpose, has at least two handle parts which are made of an elastically compliant material and enclose a cavity in a shell-like manner. The two-part design of the handle, however, is associated with the disadvantage that an additional operation has to be introduced for joining the handle parts together and there is thus an increase in the cycle time for producing such a toothbrush, which, in turn, results in increased production costs.

Packs, in particular multipacks, for toothbrushes are likewise generally known. A multipack is described, for example, in WO-A-01/70590. In this multipack, a number of toothbrushes are stored in a common blister cover made of plastic, the blister cover being closed at the rear by a blister carrier. Blister covers (also blisters for short) are produced in a known manner, by means of thermoforming, from preferably transparent plastic films and may be at least more or less in the form of the product which is to be packaged. The blister cover and the blister carrier of an individual pack are perforated all the way round in order to allow each individual pack to be removed. However, the multipack described is for single-sided display of the toothbrushes from the side of the blister cover. Removal of the individual packs requires a considerable amount of force to be applied in order to sever the all-round perforations.

The present invention has the objects of providing a handle for a brush, a handle for a toothbrush or a handle for a household brush, and also a household brush, which is particularly lightweight but voluminous and therefore easy to handle and can be produced inexpensively, with low material costs, within a short residence time in an injection-molding machine.

These objects are achieved by a handle for a brush product, by a handle for a toothbrush, by a handle for a household brush, by a household brush with such a handle, by a method of producing the handle for a toothbrush, by a method of producing the handle for a household brush and by a method of producing a brush, in particular a toothbrush.

The handle according to the invention for a brush, a toothbrush or a household brush is provided with a single-piece handle body, of which the wall encloses a cavity in the elongate handle body. The wall is opened by at least two recesses which are offset in relation to one another, pass through the wall and open out into the cavity. The inner cavity gives rise to a voluminous and, at the same time, ergonomically advantageous handle which has a particularly low weight and, on account of the reduced material usage, can be produced particularly cost-effectively and within a short cycle time, that is to say residence time, in the injection-molding machine in relation to a toothbrush with a solid handle, that is to say one "filled" with material. Furthermore, the low material thickness of the wall reduces the risk of sink marks and occlusions and the effect of heat shrinkage, which, in turn, results in an enhanced surface finish and a constant product quality.

The brush, toothbrush or household brush according to the invention is provided with a brush or toothbrush body which, in addition to a neck and a head covered with bristles, has such a handle. The brush or toothbrush body is produced, together with the handle, by injection molding involving one or more components.

In the case of a method according to the invention of producing such a handle for a toothbrush or a household brush, an injection mold with finger elements is used in the plastic injection-molding process. In the closed state of the injection mold, the finger elements are in contact with one another and prevent the throughflow of plastic at these contact locations. This results in the formation, in the solidified plastic material, of recesses which are connected to one another and form a continuous cavity in the handle body. In contrast to conventional methods of producing hollow plastic bodies, use can be made here of upright cores. The method according to the invention can dispense with the operation of joining together two individually produced handle-body parts.

In the case of a method according to the invention of producing a household brush with a hollow handle, a neck and a head are formed from plastic, together with the handle, in the injection-molding process.

Particularly preferred embodiments of the invention are provided with the features cited in the dependant claims.

A number of particularly preferred embodiments are described in detail hereinbelow with reference to a drawing, in which, purely schematically:

FIG. 1 shows a plan view of a toothbrush with a handle which has rectangular recesses in a wall which encloses an inner cavity;

FIG. 2 shows a side view of the toothbrush shown in FIG. 1;

FIG. 3 shows a plan view of the underside of the toothbrush shown in FIGS. 1 and 2;

FIG. 4 shows a sectional illustration of the toothbrush shown in FIGS. 1 to 3, the section being taken along section plane IV-IV depicted in FIG. 3;

FIG. 5 shows a cross section through the toothbrush shown in FIGS. 1 to 4, the cross section being taken along section plane V-V depicted in FIG. 4;

FIG. 6 shows a side view of a further embodiment of a head for the toothbrush which is shown in FIGS. 1 to 5, this time with cleaning and/or massage elements arranged on webs of the top side and of the underside of the toothbrush head, the webs on the underside being designed as tongue-cleaning ribs;

FIG. 7 shows a plan view of a further embodiment of a toothbrush according to the invention with a cavity in the handle body;

FIG. 8 shows a side view of the toothbrush illustrated in FIG. 7;

FIG. 9 shows a plan view of the underside of the toothbrush illustrated in FIGS. 7-8;

FIG. 10 shows a cross section of the toothbrush shown in FIGS. 7 to 9, the cross section being taken along section plane X-X depicted in FIG. 8;

FIG. 11 shows a cross section of the toothbrush shown in FIGS. 7 to 9, the cross section being taken along section plane XI-XI depicted in FIG. 8;

FIG. 12 shows a sectional illustration of an injection mold for producing the toothbrush shown in FIGS. 7 to 11, the section being taken along section plane X-X depicted in the toothbrush in FIG. 8;

FIG. 13 shows a partial illustration of a plan view of a further embodiment of a toothbrush with the handle shown in FIGS. 7 to 9, and with a tongue element which is fastened at both ends, on the neck and on the head;

FIG. 14a shows a plan view of a further embodiment of a head of a toothbrush, with tongue recesses for forming a bridge-like tongue element;

FIG. 14b shows a side view of the head shown in FIG. 14a, with tongue-cleaning ribs on the underside;

FIG. 14c shows a plan view of the underside of the head shown in FIGS. 14a and 14b;

FIG. 14d shows a cross section through the head shown in FIGS. 14a to 14c, the cross section being taken along section plane XVII-XVII depicted in FIG. 14a;

FIG. 15 shows a plan view of a further embodiment of a toothbrush body, with two tongue webs which are arranged laterally on the tongue element and are intended for bearing the tongue element in a rocker-like manner;

FIGS. 16-21 show further embodiments of toothbrush heads, with tongue elements formed in various ways on the head;

FIG. 25 shows a plan view of the top side of a further embodiment of a toothbrush according to the invention, with a central row of rectangular recesses and two elongate recesses arranged laterally in the hand-supporting portion;

FIG. 26 shows a side view of the toothbrush illustrated in FIG. 25;

FIG. 27 shows a plan view of the underside of the toothbrush illustrated in FIGS. 25 and 26;

FIG. 28 shows a cross section along section plane XXVIII-XXVIII depicted in FIGS. 26 and 27;

FIG. 29 shows a cross section of the toothbrush shown in FIGS. 25 to 27, the cross section being taken along the section plane designated by XXIX-XXIX in FIGS. 26 and 27;

FIG. 30 shows a cross section through an injection mold for producing the toothbrush shown in FIGS. 25 to 29, the cross section being taken along the section plane designated by XXVIII-XXVIII in FIGS. 26 and 27;

FIG. 31 shows a side view of a hand-supporting portion of a handle according to the invention with cavity-forming recesses arranged in all-round grooves, the hand-supporting portion being cut away along the section plane designated by XXXI-XXXI in FIG. 32;

FIG. 32 shows a plan view of the handle shown in FIG. 31;

FIG. 33 shows a longitudinal section through a toothbrush with grooves, through-holes and a blind recess open in the direction of the underside;

FIG. 34 shows a plan view of the underside of the toothbrush shown in FIG. 33;

FIG. 35 shows a side view of the toothbrush shown in FIGS. 33 and 34;

FIG. 36 shows a plan view of the top side of the toothbrush shown in FIGS. 33 to 35;

FIG. 37 shows a cross section through the toothbrush shown in FIGS. 33 to 36, the cross section being taken along the section plane designated by XXXVII-XXXVII in FIG. 36;

FIG. 38 shows a further cross section of the toothbrush shown in FIG. 36, this time along section plane XXXVIII-XXXVIII;

FIG. 39 shows a further cross section of the toothbrush shown in FIG. 36, this time along section plane XXXIX-XXXIX;

FIG. 40 shows a plan view of the top side of a further embodiment of a toothbrush according to the invention, with rectangular recesses arranged at angle in a row in the handle;

FIG. 41 shows a plan view of half of an injection mold for producing the toothbrush shown in FIGS. 1 to 5;

FIG. 42 shows a plan view of a mold half which interacts with the top mold half, shown in FIG. 41, for forming the toothbrush illustrated in FIGS. 1 to 5;

FIG. 43 shows an illustration in longitudinal section through an injection mold with the mold halves in FIGS. 41 and 42 joined together, the finger elements engaging one inside the other such that they are in contact in a tooth-like manner;

FIG. 44 shows a cross section through the injection mold shown in FIG. 43, the cross section being taken along section plane XLIV-XLIV depicted in FIG. 43;

FIG. 45 shows a side view of a head holder for fastening the head of a toothbrush during bristle covering;

FIG. 46 shows a plan view of the head holder shown in FIG. 45;

FIG. 47 shows a side view of the head holder shown in FIGS. 45 and 46, with a head clamped in;

FIG. 48 shows a plan view of the head holder shown in FIGS. 45 and 46, with a head clamped in;

FIG. 49 shows a section through the head holder shown in FIGS. 45 to 48, the section being taken along section plane XLIX-XLIX depicted in FIG. 48;

FIG. 51 shows a sectional illustration through the head holder shown in FIG. 50, the section being taken along the section plane designated by LI-LI in FIG. 50 with a head clamped in;

FIG. 52 shows a plan view of a multipack, comprising eight individual packs, for body-care articles;

FIG. 53 shows a plan view of a multipack comprising six individual packs, a multipack carrier being provided with two folding lines along gaps, which each separate pairs of individual packs;

FIG. 54 shows a perspective illustration of a display body which is formed by means of the multipack shown in FIG. 53 being folded along the folding lines;

FIG. 55 shows a side view of a further embodiment of a multipack, this time with a frame-like multipack carrier in the case of which in each case two individual packs are combined and provided with a triangular roof segment;

FIG. 56 shows a side view of a tower-like display body with a pyramid-shaped roof, which has been formed by folding the multipack shown in FIG. 55;

FIG. 57 shows a side view of a dishwashing brush with recesses on the handle and neck;

FIG. 58 shows a longitudinal section through the dishwashing brush shown in FIG. 57, the brush having two inner cavities;

FIG. 59 shows a plan view of the underside of the dishwashing brush shown in FIGS. 57 and 58;

FIG. 60 shows a cross section through the handle of the dishwashing brush shown in FIGS. 57 to 59, the cross section being taken along the section plane designated by LX-LX in FIG. 59;

FIG. 61 shows a side view of a further embodiment of a dishwashing brush, this time with essentially triangular recess openings on the handle and essentially trapezoidal recess openings on the neck;

FIG. 62 shows a plan view of the underside of the dishwashing brush shown in FIG. 61;

FIG. 63 shows a side view of a further embodiment of a dishwashing brush, this time with recess openings which are essentially rectangular and/or rounded on one side; and FIG. 64 shows a plan view of the underside of the dishwashing brush shown in FIG. 63.

Figure 22:
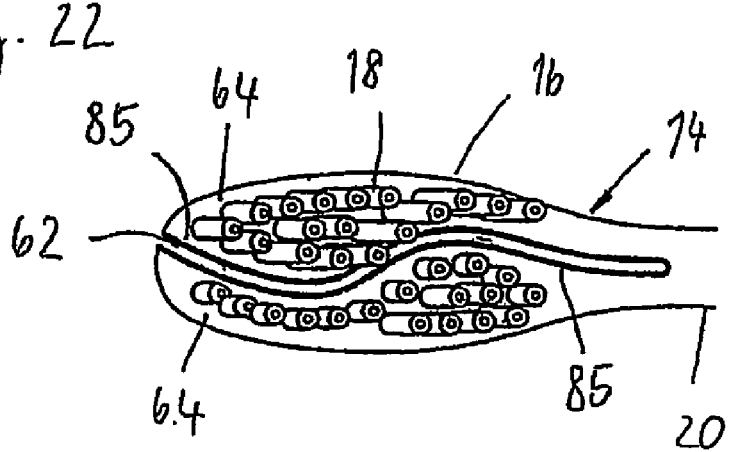
FIG. 22 shows a plan view of a further embodiment of a head of a toothbrush, with an S-shaped tongue recess for forming two tine-like tongue elements.

The toothbrushes 10 described hereinbelow are provided with a handle 12 according to the invention. A hollow body 13 of the handle 12 here is formed as part of a toothbrush body 14, which is covered with bristles 18 on its head 16, which is flattened in the manner of a spoon. The handle body 13 is connected to the head 16 via a neck 20.

The handle 12 allows the toothbrush 10 to be held in one hand, and it takes up between 45° and 65° of the overall length of the toothbrush 10. The handle 12 has an elongate, ellipsoidal outer contour and extends from a free end, which is located opposite the head 16, via a hand-supporting portion 22, and a thumb rest 24, to the start of the neck 20. The overall length of the handle 12 is between 80 mm and 140 mm, preferably between 110 mm and 120 mm. The handle 12, by virtue of its voluminous and rounded form, is of particularly advantageous design in ergonomic terms and thus aids easy and comfortable usage of the toothbrush 10. The overall length of the toothbrush 10 is between 120 mm and 230 mm, preferably 190 mm to 200 mm.

As is shown, in particular, in FIGS. 1 and 3, rounded, essentially rectangular and sunken recesses 30 are formed in a wall 32 of the handle body 13 on the top side 26, which is covered with bristles 18, and on the underside 28, located opposite. The recesses 30 here are lined up in a row at more or less equal intervals from one another along the longitudinal axis of the handle body 13 in the hand-supporting portion 22. By way of recesses 30 being offset opposite one another on the top side 26 and the underside 28, it is possible to form rectilinear through-passages through the handle body 13. The width of the recesses 30 which is visible on the top side 26 and underside 28 here is adapted in each case, at the respective position of the recesses, to the circumference of the handle body 13. As measured along the longitudinal axis of the handle body 13, the width is 2.5 mm to 140 mm, preferably 4.1 mm to 8 mm and/or 60 mm to 85 mm on the top side 26, and preferably 3.9 mm to 4.8 mm and/or 45 mm to 70 mm on the underside 28.

As is shown in FIGS. 2 and 4, the recesses 30, on account of the ellipsoidal outer contour of the handle 12, form indents 34 which are visible in side view and in longitudinal section, respectively. The indents 34 or recesses 30 which are open in the direction of the top side 26 are offset not just in the circumferential direction, but also in the longitudinal direction, of the handle 12 in relation to the recesses 30 located opposite, which are open in the direction of the underside 28.

On a side portion 36 of the wall 32, a rounded, rectangular embossing panel 38 is arranged between the indents 34 of the top side 26 and of the underside 28. This embossing panel 38 serves for applying text, preferably providing information relating to the brand/make, manufacturer and/or type. On account of the recesses 30, which are open in the direction of the top side 26 and of the underside 28 of the toothbrush 10, it is not possible to arrange the embossing panel 38 on these sides of the toothbrush without generating more accumulation of material. For this reason, the embossing panel 38 is placed on the lateral wall 32. This configuration requires the use of a lateral slide for production in an injection mold. The lateral slide here covers over and/or divides up a mold-separating line (not shown in FIGS. 43 and 44), which runs laterally around the handle 12, and further around the entire toothbrush 10, as a result of production, in order to form the embossing panel 28.

The recesses 30, or the indents 34 produced by them in the wall 32, are spaced apart from one another by webs 40. In the case of the embodiment shown in FIGS. 1 to 4, eight webs 40 are formed on the top side 26 and nine webs 40 are formed on the underside 28. As an alternative, however, it is also possible for one to twelve webs 40 to be formed on the top side 26 and for one to thirteen webs 40 to be formed on the underside 28. The webs 40 on the top side 26 of the toothbrush 10 preferably have more or less the same extent in the longitudinal direction of the handle body 13. This extent (or also width) is 1.5 mm to 6 mm, preferably 2 mm to 4.5 mm, on the top side 26. On the underside 28, located opposite, the webs 40 have a width between 1 mm and 7 mm, preferably between 2 mm and 5.5 mm. The material thickness of the webs 40, as measured at right angles to the longitudinal axis of the handle body 13, is 1 mm to 5.5 mm, preferably 2 mm to 4 mm. The material thickness here, as is shown in FIG. 4, is more or less constant on both sides of the handle body 13.

As is shown in the sectional illustration of FIG. 4, the recesses 30, after passing through the wall 32, open out into a continuous cavity 42. The cavity 42, like the handle body 13 itself, is elongate and extends more or less along the longitudinal axis of the handle body 13. The cavity 42 is open to the surroundings by way of the recesses 30. In its longitudinal end regions, it is bounded, on the one hand, by the thumb rest 24 and, on the other hand, by a rounded end piece 44, on which is located, as is shown in FIG. 3, an injection point 46 which results from the production of the toothbrush 10. As an alternative, it is also possible not to provide, or to dispense with, the end piece 44, that is to say not to close off the cavity 42 at its end and, in this way, to give the user a view into the interior and/or thus to provide a standing surface in order for the toothbrush 10 to be set down in the upright position. In a further possible embodiment, it is possible for items to be introduced into the cavity 42, for example a compressible ball which is made of soft material and moves during use can be inserted into the cavity 42.

Transverse ribs 48 are visible in the cavity 42, these ribs being oriented transversely to the longitudinal axis of the cavity 42 and tapering conically in pairs in each case. These transverse ribs 48 are caused by the production process, which will be described in detail at a later stage in the text. The transverse ribs 48 open out in each case into the ribs 40 of the top side 26 and of the underside 28, these webs being offset in relation to one another along the longitudinal direction of the handle body 13. These transverse ribs 48 make it possible to adjust/define the flexibility of the handle body 13, which encloses the cavity 42 and is produced from plastic. The flexibility/stability of the handle body 13 can be fundamentally influenced by changing the angling, the material thickness and the size.

FIG. 5 illustrates a cross section of the handle 12 of the toothbrushes 10 shown in FIGS. 1 to 4, the cross section being taken along section plane V-V depicted in FIG. 4. Alongside the cross-sectionally more or less circular outer contour of the wall 32, the inner contour of the wall 32 and thus the cavity 42 also have a more or less circular cross section. The cut-away wall 32 has an essentially constant material thickness more or less throughout the cut-away region.

As in the case of the webs 40 formed in the wall, this wall thickness is preferably 1 mm to 5.5 mm, preferably 2 mm to 4 mm. The cut-away recess 30 is formed in the manner of a blind hole and has a rounded recess base 50. Its rounded recess walls 52, which extend from recess openings 54 on the outer surface of the handle body 13 to the recess bases 50, are formed by the side portions 36 of the wall 32. Since the recess walls 52 extend into the cavity 42, it is also the case that the contour of the cavity 42 is changed as a result of alternative configurations of the recess walls 52.

The handle body 13 may be formed from soft material or hard material or a combination of soft and hard materials. In order to ensure optimum distribution of the materials, the continuous side portions 36 or walls 32 of the toothbrush 10 are used as distributing channels for the liquid plastic, in particular for distributing the soft material, which is preferably injected after the hard material. In the case of a further preferred embodiment, the transverse webs 40 are injected using soft material or a combination of hard and soft materials. In the case of the handle ribs 60 being configured at least partially from soft material, the handle 12 achieves a level of flexibility which makes it possible for the walls 32 to move in the direction of their surface normals.

FIG. 6 illustrates a further embodiment of a head 16 for the toothbrush 10 shown in FIGS. 1 to 5. This head is likewise configured with recesses 30 and webs 40. The webs 40 here are formed, on the underside 28 of the head 16, as tongue-cleaning ribs 56, which can be used for tongue-cleaning purposes or else for performing a massage function. In addition, soft/resilient massage and/or cleaning elements 58 are arranged on the top side 26 of the head 16, the top side being covered with bristles 18. The bristles 18 and the massage and/or cleaning elements 58 are arranged in each case on the webs 40 of the head 16. This embodiment shows one of the many possible applications of the current technology using offset recesses 30. The technology can be used throughout the entire toothbrush body 14. This means that, in addition to being used in the handle 12, corresponding recesses 30, webs 40 and cavities 42 may also be formed in the neck 20, head 16 and in a tongue element of the toothbrush 10, which will be described at a later stage in the text. This also applies, of course, to the above described material combinations, in particular a combination of hard and soft materials.

FIGS. 7 to 9 show a body 14 of a further particularly preferred embodiment of the toothbrush 10 according to the invention. In the case of this embodiment, the handle 12 has formed in it elongate recesses 30 which extend along the longitudinal axis of the handle body 13. The bases 50 of the recesses form two elongate webs 40 on the underside 28, as can be seen, in particular, in FIGS. 8 and 9. Handle ribs 60 are formed laterally on the outside of the handle body 13. The handle body 13 and also, in particular, the handle ribs 60, may be formed from soft material or hard material or a combination of soft and hard materials.

A likewise elongate recess 30 is visible on the underside 28 of the handle 12, the underside being shown in FIG. 9. The base 50 of this elongate recess 30 forms the web 40 which is curved outwards on the top side 26, can be seen in FIGS. 7 and 8 and runs in the direction of the longitudinal axis of the handle body 13.

FIG. 10 illustrates a section through the handle 12 along section plane X-X shown in FIG. 8. Particularly clearly visible here are the two recesses 30 which are open in the direction of the top side 26 and have their two bases 50 forming webs 40 in each case on the underside 28. The top side 26 is formed essentially by the base 50 and/or the corresponding web 40 of the recess 30 which is open in the direction of the underside 28. Two essentially semicircular sectional surfaces of the handle ribs 60 are visible laterally on the outside. It is also the case in this embodiment that the cavity 42, which is formed in the interior of the handle 12 and is surrounded by a dashed line in FIG. 10, has a more or less rectangular cross section. Of course, it is also possible to vary the number of webs 40 in this case. Three webs 40 and two handle ribs 60 are visible in FIG. 10. Alongside the 2 handle ribs 60, however, it is also possible to form 1, 5, 7 or 9 alternating webs 40.

In the case of that embodiment of a toothbrush 10 which is shown in FIGS. 7 to 9, an elastically resilient tongue element 64 is formed by a tongue recess 62 which extends from the neck 20 to the head 16 and is continuous from the top side 26 to the underside 28. The tongue recess 62 here runs initially more or less rectilinearly along the longitudinal axis of the neck 20, then opens in the form of a loop in the head 16 and runs back, once again, at least more or less parallel along the longitudinal axis of the neck 20. In a loop region of the head 16, the tongue recess 62 runs more or less parallel to the outer contour of the head 16. This region, like a frame body 66 which encloses the tongue element 64, is covered with bristles 18.

The present tongue element 64 has the characteristic that bristles 18 are fitted, both on the tongue element 64 and on the frame body 66, laterally and, in some cases longitudinally behind the tongue element 64—that is to say in the free end region of the head 16. This means that in a side view, in the transverse direction of the head 16, bristles 18 are visibly arranged both on the frame body 66 and on the tongue element 64.

As is shown in FIGS. 8 and 11, the tongue element 64 projects beyond the frame body 66 on the top side 26. The resulting spacing which is present between a bristle surface on the tongue element 64 and a bristle surface on the frame body 66 is between 0.3 mm and 3 mm, preferably between 0.5 mm and 1.5 mm.

In the sectional illustration of FIG. 11, the frame body 66 is illustrated by two semicircular sectional surfaces. The cross section of the tongue recess 62 tapers conically from the underside 28 to the top side 26 in order to serve as a directional guide as the tongue element 64 is guided back into its rest position, in which it is not subjected to loading from the outside. The tongue element 64, which is shown in cut-away form, has a trapezoidal, more or less rectangular cross section. FIGS. 8 and 11 clearly show equivalent material thicknesses both for the frame body 66 and for the tongue element 64, which has production-related advantages.

The tongue element 64 is formed such that use is made of radii of curvature of greater than 3 mm, in order to reduce the risk of injury while using the toothbrush.

The width of the tongue recess 62, on the top side 26 of the toothbrush 10, is between 0.3 mm and 2 mm, preferably between 0.5 mm and 1 mm, in the neck region and increases to 1 mm to 2 mm, preferably to 1.1 mm to 1.4 mm, in the direction of the vortex of the tongue recess 62.

The flexibility of the tongue element 64 and of the frame body 66 can be influenced in various ways. The material thicknesses, widths and geometrical shapes of the respective bodies, and also the composition of hard and/or soft materials, are parameters which are critical influences on the flexibility. The frame body 66 preferably consists of a combination of hard and soft materials. The tongue element 64 is preferably produced from hard material.

FIG. 13 illustrates an alternative embodiment of a neck 20 and head 16 for a toothbrush 10. The tongue element 64 here is fixed to the frame body 66 at a tongue vertex 68 on the head 16, this resulting in a bridge-like formation of the tongue element 64. This reduces the elastic deflectability of the tongue element 64 at its vertex 68 in relation to the frame body 66. This material bridge may consist of soft material, hard material or a combination of hard and soft materials. If only hard material is used, the material thickness can be greatly reduced at this location and, for example, a film hinge may be formed in order still to allow a certain level of flexibility. It is, of course, also possible to form such tongue elements 64 with a free end region or with two fixed end regions for toothbrushes 10 with conventional handles.

The handle 12 according to the invention and the body 14 of a toothbrush 10 according to the invention are produced together from plastic in an injection-molding process. This process will be described in detail at a later stage in the text in conjunction with FIGS. 41 to 44. FIG. 12 already shows a section through an injection mold 70 with a first mold half 72.1 and a second mold half 72.2. The section plane through the injection mold 70 corresponds approximately to that section plane through the toothbrush body 14 which is designated by X-X in FIG. 8. Accordingly, that section through the injection mold 70 which is shown in FIG. 12 constitutes the negative form of that cross section of the handle 12 from FIG. 8 which is shown in FIG. 10.

The two recesses 30 which are open in the direction of the top side 26 of the toothbrush 10 are formed by two conically tapering finger elements 74. In contact with the latter, and thus preventing the throughflow of plastic, a further finger element 74 engages between the two finger elements 74 belonging to the second mold half 72.2. The finger elements 74 in contact with one another form the recesses 30 and the cavity 42 in the finished handle 12. A non-hatched cavity 88, which is filled with plastic during production, determines the shape of the wall 32, including the webs 40 and the handle ribs 60.

FIGS. 14 to 24 illustrate further embodiments of tongue elements 64. In the case of that embodiment of the head 16 which is shown in FIG. 14a, two tongue recesses 62 extend from the head-side end region of the neck 20 to the free end region of the head 16. The tongue recesses 62 here run at least more or less parallel to one another in the region of the head 16. The tongue element 64 is formed in a bridge-like manner by the tongue recesses 62, the two opposite end regions of the tongue element 64 being fixed in each case to the frame body 66.

As is shown in FIG. 14c, in each case two head grooves 76 run at right angles to the tongue recesses 62 and congruently on the top side 26 and the underside 28 of the head 16. The material thickness, which is reduced between the head grooves 76, forms two film-like hinges 78. The film-like hinges 78 subdivide the head 16 into three head segments 80 which can be deflected elastically in relation to one another. Deflection of the head segments 80 in relation to one another is limited by limiting elements 82 assigned to the film-like hinges 78.

As is shown in FIG. 14b and the sectional illustration in FIG. 14d, the tongue element 64 is offset heightwise in relation to the frame body 66. The bristles 18 fastened on the top side 26 of the tongue element 64 project beyond the bristles 18 fastened on the frame body 66 and can thus assist in the cleaning of spaces between the teeth.

FIG. 15 shows a further embodiment of a toothbrush 10, with a neck 20 and a head 16 which is similar to the embodiment shown in FIG. 9. In contrast to the latter, the tongue element 64 here is fastened laterally on the frame body 66, in the region of the neck 20, by means of two tongue webs 84. These tongue webs 84, which are arranged more or less centrally in relation to the longitudinal axis of the tongue element 64, give rise to a rocking effect when the tongue element 64 is subjected to loading, the cleaning and massage of the oral cavity being additionally assisted as a result. The spacing between the tongue webs 84 and the point of separation of the tongue element 64 in the neck region of the toothbrush 10 is between 35% and 65%, preferably 45% and 60%, of the length of the tongue element 64.

A further embodiment of such a toothbrush 10 with a rocker effect may be configured such that a plurality of tongue webs 84 are formed and the user can adjust the flexibility and/or the rocker effect of the tongue element 64 himself by means of severing tongue webs 84. The tongue webs 84 here may be produced exclusively from hard material, exclusively from soft material or from a combination of hard and soft materials.

FIGS. 16 to 21 show specific possible configurations of tongue elements 64. The loop region of the tongue recess 62 may be formed in the head 16 like an oval (FIG. 16), rhombus (FIG. 17), balloon (FIG. 18) and/or pictogram with rounded, angular and/or rectilinear segments (FIGS. 19 to 21). Different embodiments of tongue elements 64, which may possibly also be colored, make it easier to recognize a certain toothbrush 10. Of course, it is also possible in this embodiment—in analogy to FIG. 13—for the tongue vertex 68 to be connected to the frame body 66.

Figure 23:
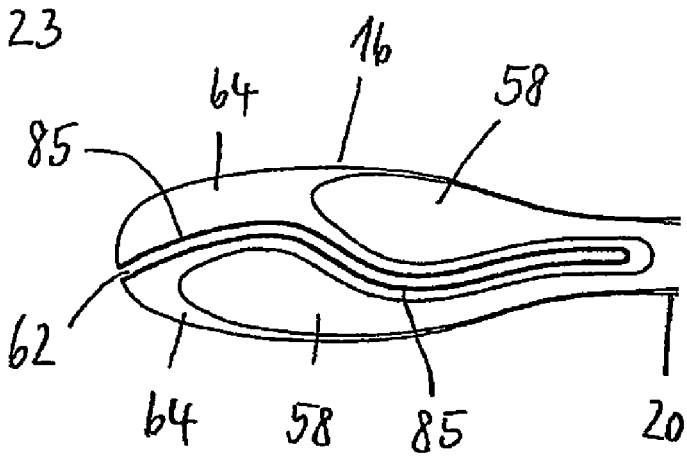
FIG. 23 shows a plan view of the underside of the head shown in FIG. 22.
Figure 24:
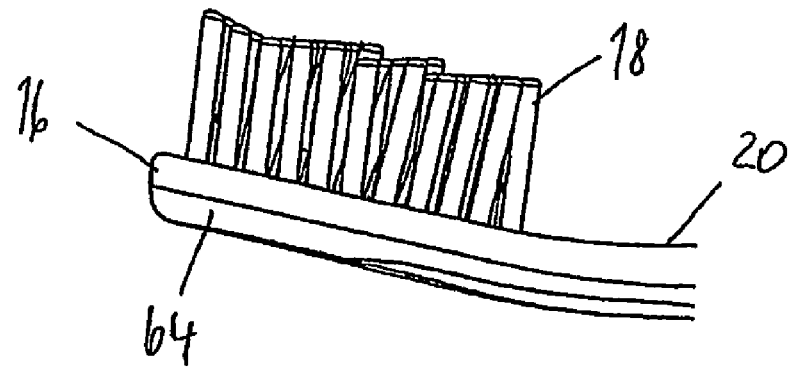
FIG. 24 shows a side view of the head shown in FIGS. 22 and 23.

FIGS. 22 to 24 illustrate a further embodiment of a multipart head 16. The head 16 is provided, from the neck 20 to the free end of the head 16, with a gap-like tongue recess 62 which is curved in an S-shape and can be seen in the plan views of FIGS. 22 and 23. This tongue recess 62 forms two tine-like tongue elements 64, which are each provided with bristles 18 and can be deflected independently of one another. The tongue recess 62 has a more or less constant width of 0.7 mm to 1 mm, preferably of 0.8 mm to 0.9 mm, along its entire length.

The two tine-like tongue elements 64 are beveled and/or rounded, on the tongue-recess side, at an angle of smaller than 20°, preferably smaller than 8°, in relation to a gap perpendicular running essentially perpendicularly to the top side 26 and to the underside 28.

The two tongue elements 64 may have different material thicknesses, as can be seen in FIG. 24, and different topographies on the top side 26 and/or underside 28. In order to avoid possible injury in the oral cavity, tangents in a longitudinal center plane which extend essentially parallel to, and between, the top side 26 and the underside 28 form, at the walls 85 of the tongue recesses 62, an angle of not more than 45°, preferably not more than 36°, with the longitudinal axis of the head 16.

By virtue of the S-shaped configuration of the tongue recess 62, portions of one tongue element 64 project in each case beyond the longitudinal axis of the head 16 in the direction of the opposite tongue element 64. They project beyond the longitudinal axis here by not more than 3 mm, preferably by not more than 2 mm.

The two tongue elements 64 preferably have different levels of flexibility in relation to the neck 20 and/or the handle 12 and thus impart different contact pressures, via the bristles 18, to the tissue and/or teeth in the oral cavity when the toothbrush 10 is being used. These different levels of flexibility can be achieved by the tongue elements 64, in their starting region at the neck 20, having different cross sections and/or different arrangements and/or different ratios or structures of hard and/or soft materials.

The head 16 shown in FIGS. 22 to 24 may also be embodied such that the two tongue elements 64 are arranged in a V-shaped manner in relation to one another. The longitudinal axes thereof here can project from the neck 20 at different angles in relation to the longitudinal axis of the head 16 and/or the tongue elements 64, as seen in cross section, may be inclined in relation to one another about the longitudinal axis of the head 16 and thus form preferably a V-shaped top side 26 which tapers in the direction of the common tongue recess 62. The respective angles between the top sides 26 of the tongue elements 64 and the longitudinal center plane of the head 16, this plane extending essentially parallel between the top side 26 and underside 28 of the head 16, are preferably less than 10° in each case. Even such small angles are sufficient to give different levels of flexibility to the tongue elements 64, and thus different levels of cleaning action.

In addition, it is possible for the underside 28 of the toothbrush body 14 to be covered on the head 16, at least in part, with a soft material. The soft material here preferably forms massage and/or cleaning elements 58, as are shown, for example, in FIG. 23. The planar segments with soft/resilient material, and/or with massage and cleaning elements 58 formed therewith, preferably have different sizes and shapes per each tongue element 64. Since the two tongue elements 64 can be deflected in a flexible manner in relation to one another, and can thus adapt themselves better to the surfaces in the mouth, an improved massage and cleaning action is achieved.

The bristle-carrying top side 26 of the head 16 is preferably formed by hard material of the toothbrush body 14. Further plastics may be applied by injection, as hard material and/or soft material, to the bristle-carrying top side 26 of the toothbrush body 14 for the purpose of forming massage and/or cleaning elements 58. The latter assist and supplement the conventional bristles 18 in their cleaning function. Once again, these cleaning elements 58 are also arranged differently and/or asymmetrically in each case for each tongue element 64 on the top side 26.

The curved shape of the tongue recess 62 and the additional, preferably asymmetrically configured injected structures make it possible for the levels of flexibility of the individual tongue elements 64 to be adjusted independently of one another.

In the case of that embodiment of the toothbrush 10 which is shown in FIGS. 25 to 27, the handle 12 is provided with six essentially rectangular, sunken recesses 30 arranged in a row along the longitudinal axis of the handle 12. The openings 54 of these recesses are enlarged in each case in the direction of the end regions of the handle 12.

Also formed laterally on the handle 12 are elongate, lateral recesses 30 extending thus over more or less the entire hand-supporting portion 22. The bases 50 of these laterally arranged recesses 30 form, as seen from the top side 26, two circle-segment-like webs 40 which taper to a point in each case. These are clearly visible, in the side view of FIG. 26, as slightly curved lines running essentially parallel to the underside 28.

Additionally formed on the handle 12 are further recesses 30 which are open in the direction of the underside 28 and are offset along the longitudinal axis of the handle 12 in relation to the recesses 30 located opposite them on the top side 26. The recesses 30 which are offset in relation to one another form, and in turn open out into, the cavity 42.

The cavity 42, which is enclosed by the webs 40 and recess walls 52, is illustrated in the sectional illustrations of FIGS. 28 and 29. The figures show cross sections of the handle along section planes XXVIII-XXVIII and XXIX-XXIX depicted in FIGS. 26 and 27. Section plane XXVIII-XXVIII runs at right angles to the longitudinal axis of the handle 12 and intersects a recess 30 which is open in the direction of the top side 26. The recess 30 is formed in the manner of a blind hole and is bounded by recess walls 52 and the recess base 50, which forms the web 40. The elongate recesses 30 which are arranged laterally on the handle body 13, and are likewise open in the direction of the top side 26, are not bounded laterally on the outside by recess walls 52. They form angled through-passages 86 with the two recesses 30 which are open in the direction of the underside 28. The bases 50 of the laterally arranged recesses 30 that are open in the direction of the top side 26 form webs 40 with a circle-segment-like cross-sectional surface area. They may be produced from soft material, hard material or a combination thereof. The longitudinal axis of the cavity 42, which is formed centrally in the handle body 13, coincides with the longitudinal axis of the handle body 13. The cavity 42, as is shown in FIGS. 28 and 29, has an essentially rectangular cross section.

The section plane XXIX-XXIX, as is shown in FIGS. 26 and 27, runs through a web 40 on the top side 26 and through a recess opening 54 on the underside 28.

FIG. 30 shows a sectional illustration of the two-part injection mold 70 for producing the toothbrush 10 from FIGS. 25 to 29. The section plane selected here corresponds to the section plane which is designated by XXIX-XXIX in FIGS. 26 and 27. Correspondingly, that sectional image of the injection mold 70 which is shown in FIG. 30 constitutes a negative form of that cross section through the handle 12 which is shown in FIG. 29. It is also the case here that finger elements 74 which extend from the first mold half 72.1 into the second mold half 72.2 and two cut-away finger elements 74 extending from the second mold half 72.2 into the first mold half 72.1 bound the cavity 88 (mold cavity). The finger elements 74 form the recesses 30 in the finished handle 12. The angled through-passages 86 and the cavity 42 are formed by the finger elements 74 of the first mold half 72.1 and of the second mold half 72.2 being in contact with one another.

FIGS. 31 and 32 illustrate a further embodiment of a handle 12 according to the invention. In this case, all-round grooves 90 run in each case on the top side 26 and the underside 28. The grooves 90 of the top side 26 and those of the underside 28 are located congruently opposite one another. The grooves 90, as can be seen, in particular, in FIG. 32, contain recesses 30 which are offset in relation to one another. The recesses 30 of the grooves 90 which are open in the direction of the top side 26 and the recesses 30 of the grooves 90 which are open in the direction of the underside 28 are offset in relation to one another, as in the region which is cut away in FIG. 31. The section plane for the region which is shown in cut-away form in FIG. 31 is designated by XXXI-XXXI in FIG. 32. The offset recesses 30 form webs 40 which are offset in relation to one another in the grooves 90 and, in turn, enclose the cavity 42, which is depicted by dashed lines in FIG. 31. As is shown in FIG. 32, the grooves 90 may be formed in an ovally open or else linear manner.

FIGS. 33 to 39 illustrate a further embodiment of a toothbrush 10. In the case of this embodiment, both all-round grooves 90 and ovally elongate grooves 90 are formed on the top side 26 and the underside 28. This embodiment may be provided both with a hollow handle 12 and with a conventionally filled handle. Additionally formed on the handle 12, in particular in the region of the thumb rest 24, are through-holes 92, which continue from the top side 26 to the underside 28. These through-holes 92 may likewise be arranged in grooves 90. As is illustrated in FIG. 33, the handle 12 is provided, in the hand-supporting portion 22, with a blind-hole recess 94 which is open in the direction of the underside 28.

FIGS. 37 to 39 show cross sections of the toothbrush which is shown in FIGS. 33 to 36, the relevant section planes being designated by XXXVII-XXXVII to XXXIX-XXXIX in FIG.

36. The through-holes 92 passing centrally through the handle body 13 are clear to see. The blind-hole recess 94 which is open in the direction of the underside 28 is shown in cut-away form in the cross section of FIG. 39. The grooves 90 which are located congruently opposite one another on the top side 26 and underside 28 are likewise visible in all three sectional illustrations of FIGS. 37 to 39.

FIG. 40 shows a further embodiment of a toothbrush 10 according to the invention. This embodiment is constructed in a manner essentially analogous to the toothbrush 10 shown in FIGS. 1 to 5. However, the recesses 30 which are open in the direction of the top side 26 and underside 28 in each case are not oriented in the same ways. The recesses 30, which are provided with rectangular recess openings 54, have been rotated in relation to one another in each case about their longitudinal axes, which are oriented at right angles to the longitudinal axis of the handle body 13. On the one hand, this makes it easier to recognize a specific toothbrush 10 and, on the other hand, it gives the cavity 42, formed by the recesses 30, a characteristic configuration.

FIGS. 41 to 44 illustrate an injection mold 70 which is used for producing a handle 12 according to the invention and/or for producing a toothbrush 10 according to the invention. As has already been mentioned, the injection mold 70 has a first mold half 72.1, which is illustrated in a plan view in FIG. 42, and a second mold half 72.2, which is illustrated in a plan view in FIG. 41. In order to produce the toothbrush 10 shown in FIGS. 1 to 5, the two mold halves 72.1 and 72.2 are positioned one upon the other by way of the front surfaces shown in FIGS. 41 and 42, in order for plastic components to be injected, in an injection-molding process, into the continuous cavity 88 which is formed once the two mold halves 72.1, 72.2 have been put together. The plastic is injected via an injection hopper 96, which is depicted in FIG. 43 and is open in the direction of the cavity 88, and this leads to the injection point 46 being formed in the finished toothbrush 10. Examples of plastics used for injection molding the toothbrush body 14, including the handle body 13, are hard materials such as polypropylene (PP), polyester (PET), polycyclohexanedimenthanol terephthalate (PCT/PCT-A (acid-modified)/PCT-G (glycol-modified)), polyethylene (PE), polystyrene (PS), styrene acrylonitrile (SAN), polymethyl methacrylate (PMMA), acrylonitrile butadiene styrene (ABS), etc., preferably polypropylene (PP). In the case of polypropylene (PP) being used, the plastic has a modulus of elasticity of 1000 N/mm$^2$ to 2400 N/mm$^2$, preferably of 1300 N/mm$^2$ to 1800 N/mm$^2$.

As can be seen in the sectional illustration of FIG. 43, the finger elements 74 belonging in each case to the first and second tool halves 72.1, 72.2 engage one inside the other so as to prevent the throughflow of plastic at their contact surfaces 100. The exclusion of plastic between the contact surfaces 100 means that the recesses 30 in the cured plastic body are connected to one another to form the cavity 42.

As in the cross section shown in FIG. 44, this cross section being taken along the section plane designated by XLIV-XLIV in FIG. 43, the individual finger elements 74 taper in each case conically at an angle between 5° and 15°, preferably 10°, and are oriented along a demolding direction E for separating the mold halves 72.1, 72.2. The annular-segment-like cavity 88 in the sectional image forms the wall 32, which encloses the cavity 42, in the finished handle body 13. A finger head 102 of the finger elements 74 here forms the subsequent recess base 50, by means of which the adjacent recesses 30 located opposite one another are spaced apart in the form of a web 40. The corresponding cross section of the finished toothbrush 14 is shown in FIG. 5.

As an alternative to that injection mold with fixed finger elements 74, oriented along the demolding direction E, which is shown in FIGS. 41 to 44, it is also possible to form the finger elements 74 as pull-out slides or cores. It is thus possible for the finger elements 74 to be oriented at more or less any desired angles in relation to the longitudinal axis of the cavity 88 and for recesses 30 to be formed in any desired position in the handle body 13. Consequently, the recesses 30 in the cured plastic body may thus be offset as desired in relation to one another within the circumferential direction and in the longitudinal direction of the handle body 13.

The material thickness of the wall 32 is determined by the extent of the cavity 88 and the size of the finger elements 74. They can be adapted in accordance with the respective loading for different user groups. In addition to the size of the finger elements 74, it is also possible for the shape of the latter to vary to a pronounced extent and to be adapted to specific requirements. The extent of the finger elements, however, should be selected such that the stability of the handle body 13 overall is not excessively reduced.

The recesses 30 and the cavity 42 formed by them results in a reduction in volume and weight of between 35% and 55% in comparison with a handle which is completely filled with plastic. The volume ratio between a completely filled toothbrush body 14 and a hollow toothbrush body 14 according to the invention has values between 1.35:1 and 2.2:1.

The finger elements 74 may be configured such that it is not only the case that they vary along the handle 12 from recess 30 to recess 30, but also that the cross section of each finger element 74 varies along its longitudinal direction. Use may be made here of cross sections which are oval, circular, half-moon-shaped, sickle-shaped, square, n-sided or provided with the outlines of animals or figures.

Differently configured finger elements 74 and the various arrangements thereof also give rise to different embodiments of contact surface 100 between adjacent finger elements 74 and different kinds of recess walls 52. It is consequently likewise possible for the cavities 42 to be formed with different cross sections, which may be, for example, square, circular, halfmoon-shaped, sickle-shaped, oval, rectangular and n-sided or provided with the outlines of figures and animals.

The reduced volume of material in a handle 12 according to the invention and/or a toothbrush 10 according to the invention makes it possible, on the one hand, to lower the material costs and, on the other hand, to decrease the cycle time, that is to say the residence time on the injection-molding machine during production of such a body, since the injection-molded plastic body cools down more quickly. These advantages result in optimization of the production costs of the handle 12 and/or of the toothbrush 10, while maintaining a voluminous and ergonomically advantageous exterior shape. In addition, the reduced wall thicknesses make it possible to reduce, or even avoid, the risk of occlusions or sink marks. Furthermore, the effect of heat shrinkage of the plastic body is reduced and it is possible to provide high-quality surfaces along with the more uniform product quality, in particular between products from different cavities 88 of the injection mold.

As a result of the embossing panel 38 being arranged laterally, a further step is necessary prior to the plastic body being demolded from the injection mold 70 in the demolding direction E. The embossing panel 38 is formed by a lateral slide which has to be pulled out prior to the abovementioned demolding operation. This lateral slide has not been illustrated in the injection mold in FIGS. 41 and 42. Taking the arrangement of the embossing panel 38 on the toothbrush in FIG. 2 as a comparison, however, it can be concluded that this lateral slide is arranged in the region of the handle 12 which is to be formed.

Once the handle body 13 and/or the toothbrush body 14 have/has solidified, first of all movable slides, if used, are pulled out and then the mold halves 72.1, 72.2 are separated from one another. In order to demold the plastic body in optimum fashion, the mold halves 72.1, 72.2 contain ejectors and forward pushers (not shown) which force the plastic parts out in the demolding direction E during, and after, the operation of opening the injection mold 70.

The forward pushers, and the ejectors, push externally on the outwardly directed circumference of the webs 40 of the respective toothbrush side. As a result of the forward pushers, the toothbrush body remains in adherence to a predetermined mold half 72.1, 72.2 as the injection mold 70 is opened, that is to say as the mold halves 72.1, 72.2 are separated. For this purpose, the toothbrush body is demolded from the one half of the cavity 88 by means of the forward pushers as the injection mold 70 is opened. The ejectors, finally, cause the toothbrush body to be demolded from the other mold half 72.1, 72.2.

Each mold half 72.1, 72.2 contains, for this purpose, two to fifteen, preferably two to eight, forward pushers and/or ejectors which, on the one hand, are directed toward the webs 40 but, on the other hand, are also arranged in the neck and head regions of the toothbrush 10 which is to be injection molded and, during the demolding operation, subject the respective locations to pressure in order to allow demolding to be carried out.

The forward pushers and ejectors move along the demolding direction E of the injection mold 70. The forward pushers and the ejectors move parallel to the demolding direction E, but in opposite directions. The forward pushers move in the demolding-direction E, and the ejectors move counter to this direction.

The ejected plastic bodies are then preferably removed from the cavity 88 by a robot and either transferred into a further cavity, preferably of the same injection mold 70, in order for further hard materials and/or soft materials to be applied by injection or are demolded for further processing outside the injection mold 70.

For applying further plastic components by injection, it should be noted that the hollow or skeletal structure of the plastic body has to be supported in a further cavity in relation to the injection pressure for applying further plastic materials by injection. In particular the finger elements 74 which are already used for producing the handle body 13 and/or the toothbrush body 14 are suitable for this purpose. They are moved into the cavity 42 once again in order to protect the cavity against the ingress of further plastic materials and, at the same time, to support the contour.

Examples of soft materials used for forming soft elements on the handle 12, for example the webs 40, on the neck 20 or on the head 16 are polyethylene (LDPE, HDPE), polyurethane (PUR) and preferably a thermoplastic elastomer (TPE). The Shore A hardness of the soft material used is preferably below 90. In particular soft elements which are arranged in the hand-supporting portion 22 in the form of ribs and/or protuberances made of a soft material render the toothbrush 10 considerably more convenient to use since the resulting surface topography channels away liquid and avoids the situation where the hand slips off from the handle 12. It is also advantageously possible for injection points for the soft material to be selected in the recesses 30 and/or in the cavity 42. This injection point, however, is preferably selected to be in the outer surface along the rear third of the handle body 13, e.g. on a web 40.

Punching processes are preferably used for fitting conventional bristles 18 on the head 16. The bristles 18 are conventionally produced from polyamide (PA) or polyester (PBT) and can be arranged, together with soft/resilient massage or cleaning elements 58, in a bristle arrangement with a length between 15 mm and 35 mm, preferably between 24 mm and 30 mm. The bristle arrangement is preferably fitted, at least in part, with conventional bristles 18. The soft/resilient massage and cleaning elements 58 are preferably fitted on an elastically deflectable tongue element (or tongue elements) 64 of the brush heads 16 described.

During the bristle-covering process, the head 16 and, in particular, the elastically deflectable tongue elements 64 have to be fixed mechanically in a head holder 104, as is shown in FIGS. 45 to 51.

FIGS. 45 and 46 show the head holder 104, in the first instance, without a head 16 clamped therein. The head holder 104 has a base plate 106 which is provided, on one side, with two laterally movable fixing pins 108 and an angled clamping bracket 110. Arranged between fixing pins 108 and the clamping bracket 110 are two clamping strips 112 which are adapted, in shape and material thickness, to the tongue recesses 62. Located between the clamping strips 112, in addition, is a clamping platform 114, which projects beyond the base plate 106 in order to support and position the tongue element 64, which projects beyond the frame body 66 in the toothbrush 10.

With the head 16 inserted into the head holder 104, the clamping bracket 110, as is shown in FIGS. 47 and 48, grips over the free end region of the head 16 on the top side 26, while the two fixing pins 108, on account of their minimal spacing apart from one another, can accommodate merely the tapered neck 20, but not the widened head 16, between them. The spacing between the fixing pins 108 and the clamping bracket 110 is adapted to the length of the head 16. In addition, the clamping bracket 110 is guided around the free end region of the head 16 in order to prevent deflection of the head 16 about one of the fixing pins 108. With the head 16 in the clamped-in state, the clamping strips 112 engage in the tongue recess 62 from the underside 28 and the clamping platform 114 supports the tongue element 64. The narrowering of the tongue recess 62, as a result of the engagement of the clamping strips 112 in the tongue recess 62, allows the entire head 16, including the tongue element 64, to be clamped by means of the laterally movable fixing pins 108. This state of a head 16 clamped in the head holder 104 is shown in the sectional illustration of FIG. 49. The section plane selected here is indicated by XLIX-XLIX in FIG. 48 and runs transversely through the head 16. It is additionally possible to use lateral clamping elements (not illustrated), which likewise press on the frame body 66.

Figure 50:
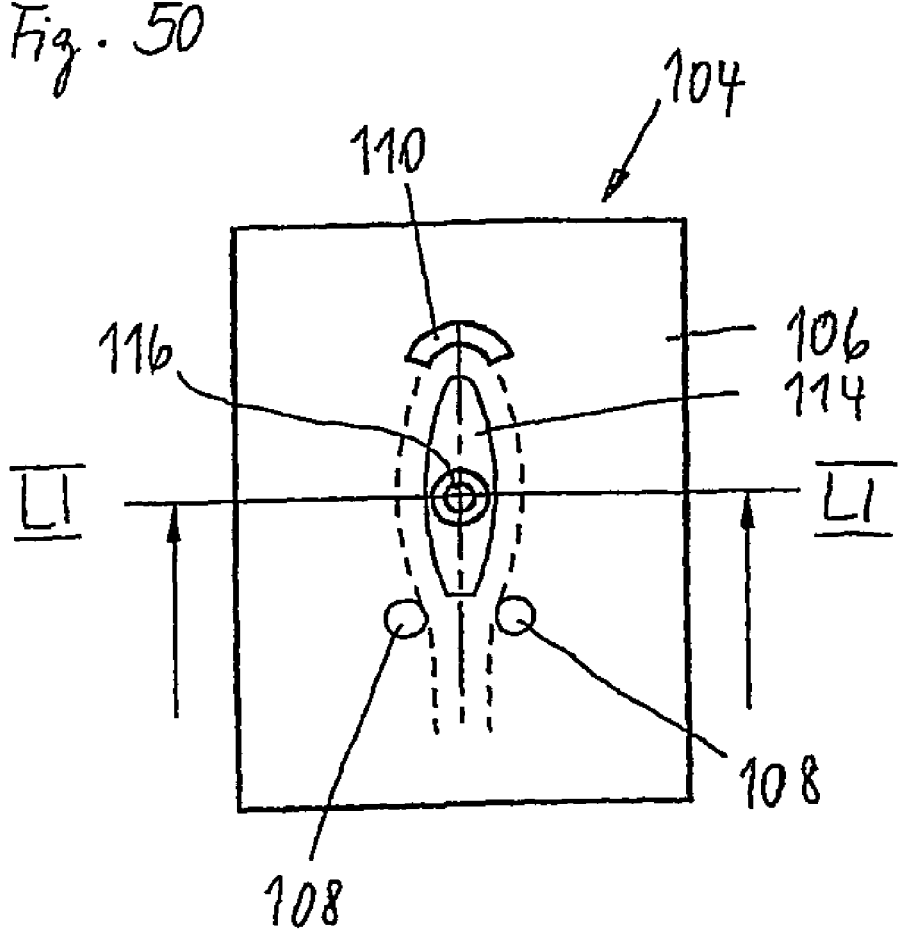
FIG. 50 shows a plan view of a further head holder for a head with a suction-attachment connector for fixing a tongue element.
Figure 51:
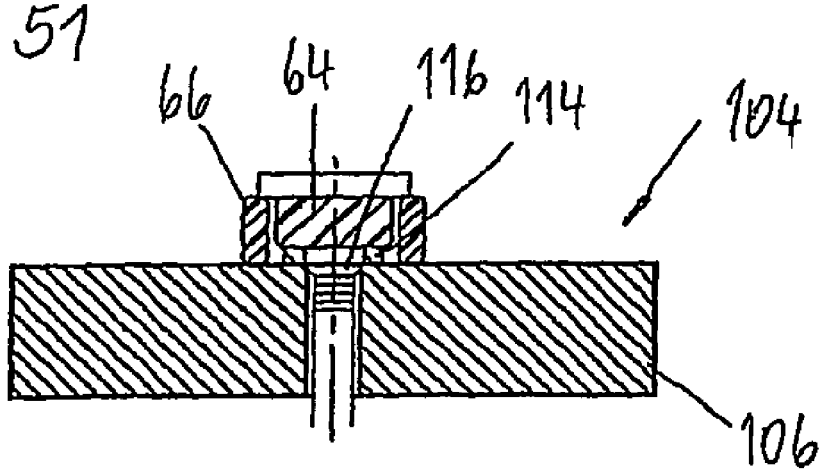

As an alternative, or in addition, the tongue element 64 can be fixed to the clamping platform 114 by means of suction attachment during bristle covering. A head holder 104 which is suitable for this purpose is illustrated in FIGS. 50 and 51. In the case of this apparatus, an open suction-attachment connector 116 opens out approximately centrally in the clamping platform 114. As is shown in FIG. 51, the tongue element 64 rests on the clamping platform 114, and closes the suction-attachment connector 116 in the process, as the head 16 is clamped in. In order to prevent the tongue element 64 from being lifted off, a negative pressure is generated in the suction-attachment connector 116. The head 16, in this arrangement, is fixed jointly, for bristle-covering purposes, by the clamping bracket 110, the suction-attachment means 116 and the movable fixing pins 108. It is, of course, possible to use an analogous apparatus construction, and an analogous method, for retaining and clamping the head 16 for all the brush heads described.

Following injection molding of the handle body 13 and/or of the toothbrush body 14 from a hard material, possible transfer of the plastic body into a further cavity for applying one or more hard and/or soft materials by injection, and subsequent bristle covering of the head 16, the handle 12 is embossed and/or has text applied to it, in the embossing panel 38 provided for this purpose (see also FIG. 2). For embossing the embossing panel 38, which is preferably arranged laterally on one side of the handle 12, the handle body 13 has to be supported again in order to be able to withstand the pressure of an embossing tool, and to prevent the handle 12 from being deformed, or even destroyed, in the process.

The embossing panel 38 is configured as a surface which is recessed into the wall 32 and from which, for example, text in relief rises up and projects beyond this recessed surface, but not beyond the outer contour of the handle 12. The embossing panel 38 and, if there is any, the text in relief are produced by means of lateral slides as early as the injection-molding process. The depth of the embossing panel 38 here is variable and can thus be adapted to the rounded outer contours. The embossing panel 38 is preferably rectangular and has dimensions of 35 mm×9 mm, preferably of 27 mm×6.25 mm. The longer side of the embossing panel 38 here is preferably oriented along the longitudinal direction of the handle 12. As an alternative to embossing, it is also possible to form lettering from two different material components, in particular from a combination of hard and soft materials. This requires, in turn, a correspondingly formed lateral slide which, in certain regions, covers over and/or divides up the all-round mold-separating line of the handle 12.

The present method of producing a handle 12 for a toothbrush 10 can likewise be used in general for producing handles 12 for brush products or body-care products with a handle 12 and a treatment head, for example wet shavers, hair brushes, mascara brushes, etc. Of course, those embodiments of the handle 12 which have been discussed can also be used for these body-care products, in order to optimize the material usage and the cycle times. The cited embodiments for heads 16, for example with tongue elements 64 or bridge-like tongue elements 64, are preferably used in manual toothbrushes 10. However, it is nevertheless possible to use such heads 16 in electric toothbrushes with rotating heads, electric toothbrushes with rotating and fixed brush-head segments, electric toothbrushes with swiveling brush heads, vibration and sonic toothbrushes or a combination of these types of electric toothbrush.

Both a toothbrush 10 according to the invention and other body-care articles may be packaged and displayed by means of the multipack 118 which is described hereinbelow and is shown in FIGS. 52 to 56. The multipack 118 shown in FIG. 52 has eight individual packs 120 each with one toothbrush 10. The multipack 118 can also be used for 4, 6, 10 or 12 individual packs 120. Each individual pack 120 is provided with a blister carrier 122 and a blister cover 124.

The blister carrier 122 is preferably produced from paper, cardboard, plastic material or a metal foil. If a plastic material is used, this is preferably the same material which is used for the blister cover 124. Correspondingly, the blister carrier 122 and the blister cover 124 may be produced from polyethylene (PE), polypropylene (PP), polyvinyl chloride (PVC), polystyrene (PS), polyethylene terephthalate (PET), and preferably from polyvinyl chloride (PVC) or polyethylene terephthalate (PET). The plastic material here is preferably at least translucent or transparent. The blister carrier 124, furthermore, may comprise two plastic layers, between which, for example, cardboard is inserted or welded. If a metal foil is used as the blister carrier 122, the material which is preferably used is aluminum.

Each individual pack 120, which preferably accommodates a body-care article, in this case a toothbrush 10, is provided with a fastening aperture 126, through which a fastening element is intended to engage, and allows hanging display of the individual pack 120. The present multipack 118 has the advantage that, in the case of a large number of objects for sale being displayed together, each one can be removed individually, and in any desired order, without the multipack 118 remaining being destroyed. In addition, it is also possible for the individual packs 120 which have been separated out from the multipack 118 to be hung up separately and displayed individually. In a multipack 118, for example toothbrushes 10 of different colors, models, degrees of hardness, and with different accessories, replacement heads for electric toothbrushes or manual toothbrushes, interdental products, hair brushes, etc. can be packaged, and displayed, in a mixed arrangement or as a group of identical products.

In the case of the multipack 118 shown in FIG. 52, the blister carriers 122 of the individual packs 120 are rectangular and separated from one another by a gap 128. The blister carriers 122 are fastened on the multipack carrier 130 merely by way of one of their shorter sides, and are free on the other three sides. It is thus considerably easier and more convenient for the individual packs 120 to be separated out of the multipack 118. A separating line 132 is formed between the blister carrier 122 and the multipack carrier 130. In the case of that embodiment of the multipack 118 which is shown, the separating line 132 is perforated in order for it to be possible for the individual packs 120 to be separated from the multipack carrier 130 even more easily and without the individual pack 120, or the multipack 118, being destroyed.

The multipack carrier 130 is likewise rectangular and is provided with two further fastening apertures 126. Fastening the individual packs 120 along their shorter sides on a longer side of the multipack carrier 130 results in a comb-like arrangement. The blister carriers 122 are produced from the same material, or in the same sheet, as the multipack carrier 130, but are connected only by way of perforations.

The fastening apertures 126 of the multipack carrier 130 are configured as single or double holes. They correspond to standard "European" holes. Hooks, cords, wires or other fastening means, preferably so-called "European" hooks, can be guided through the fastening apertures 126 to provide for a hanging display.

The multipack carrier 130 has a central folding line 134 which connects the two longer sides and runs parallel to the gaps 128. The folding line 134 divides the multipack carrier 130 into two parts of more or less the same size. By virtue of the multipack carrier 130 being folded along the folding line 134, the rear sides of these two parts of the multipack 130 and rear sides of the blister carriers 122 connected thereto come into abutment. On account of the multipack 118 being formed symmetrically in relation to the folding line 134, it is also the case that the two fastening apertures 126 of the multipack carrier 130 end up positioned congruently one above the other. In conjunction with a fastening element, the multipack 118 can thus be presented for double-sided display.

In order to increase the stability in the folded position of the multipack 118, the two parts of the multipack carrier 130 can be fastened on one another. This fastening can be done using various fastening means. It is thus possible to use, for example, clips or staples, in particular metal ones, adhesives, rivets, welding means and the like in order to fasten the two parts of the multipack carrier 130 back to back and/or fixed them on one another.

FIG. 53 shows a further embodiment of a multipack 118. In this case, six individual packs 120 are fastened on a multipack carrier 130 via in each case one of their shorter sides. The multipack carrier 130 in this case has two folding lines 134 running parallel to one another. The folding lines 134 likewise run parallel to the gaps 128. They subdivide the multipack carrier 130 into three parts of more or less equal size, which each have two individual packs 120 assigned to them.

If the two outer parts of the multipack carrier 130 are folded along the folding lines 134 through 120° in the direction of the blister carriers 122, a display body 136, which is shown in FIG. 54, is formed. The display body 136 is tubular and has a triangular top view. In each case two adjacent parts of the folded multipack carrier 130 enclose an angle of 60°. The blister covers 124 of the individual pack 120 are directed outwards and allow three-sided display of the body-care articles. Fastening means in the form of threads 138 can be pulled in each case through the three fastening apertures 126 in the multipack carrier 130 and brought together at a hook 140. The tubular or tower-like display body 136 can thus be hung up for display purposes.

FIG. 55 illustrates a further embodiment of multipack 118. In this case, pairs of individual packs 120 are fastened in each case, along one of their shorter sides, on the multipack carrier 130, which encloses them in a frame-like manner. The remaining sides of the individual packs 120 are separated from one another, and from the frame-like multipack carrier 130, by gaps 128.

Folding lines 134, which run parallel to the gaps 128 between the individual packs 120, are formed on the multipack carrier 130 in each case between pairs of individual packs 120. Each part of the multipack carrier 130 has a fastening aperture 126 above the separating lines 132.

Above the multipack carrier 130, triangular roof segments 142 are integrally formed, in addition, between the folding lines 134. Each of these roof segments 142 has, on one of its free sides, a trapezoidal fixing strip 144. A further fixing strip 144 is fastened laterally on the outside of the multipack carrier 130.

If the multipack carrier 130 is then folded along the folding lines 134 through 90° in each case in the direction of the blister carriers 120, this results in a tower-like display body 136 being formed. The display body 136 is shown in FIG. 56 and, on account of the equally spaced-apart folding lines 134, extends upwards from a square base.

The roof segments 142 are likewise angled in relation to one another about the further folding lines 134, which are formed between them and the multipack carrier 130, so as to form a closed roof 146 which tapers to a point. By means of the fixing strips 144, respectively adjacent parts of the multipack carrier 130 and roof segments 142 which come into abutment as a result of folding can be fastened on one another. This fastening increases the stability of the tower-like display body 136 and allows the latter to stand upright on its own. In a manner similar to FIG. 54, it is possible for the display body 136 to be provided with threads 138 and hung up on a hook 140, for four-sided display purposes.

As an alternative, it is also conceivable to have display bodies 136 of which the sides have in each case just one individual pack 120 or more than two individual packs 120 and/or the multipack carrier 130 is subdivided by further folding lines 134 into a greater number of parts, in which case the multipack carrier 130 is folded to form display bodies 136 with an n-sided plan view, where n can preferably be 3, 4, 5, 6, 7 or 8.

In addition to the toothbrushes 10, it is also possible for the dishwashing brushes 210, which will be described hereinbelow, to be provided with a handle according to the invention, which in this context is designated 212. Dishwashing brushes 210 here are an example of brushes used for manual cleaning around the household. In addition to dishwashing brushes, it is also possible for other household brushes, such as plate, pan and dishbrushes, brushes for sweeping, dustpan brushes and toilet brushes or also cleaning devices with other cleaning elements, for example feather dusters, to be provided with a handle 212 and further features which have been cited in conjunction with the handle 12 for toothbrushes 10.

It is also the case with the dishwashing brush 210 that a hollow body 213 of the handle 212 is formed as part of a brush body 214, which is covered with bristles 218 on its angled head 216. The handle body 213 is connected to the head 216 via the neck 220.

The handle 212 serves for holding the dishwashing brush 210 in one hand and has a length between 80 mm and 120 mm, preferably between 90 mm and 115 mm. The handle 212 is provided with an elongate-ellipsoidal outer contour and extends from a free end, which is located opposite the head 216 and on which a ring 221 or a hook is formed for the purpose of hanging up the dishwashing brush 210, to the start of the neck 220. The diameter of the handle 212 is between 10 mm and 30 mm, preferably between 20 mm and 27 mm. The neck 220, which adjoins the handle 212, has a length between 50 mm and 100 mm, preferably between 65 mm and 85 mm. The diameter of the neck 220 is between 6 mm and 18 mm, preferably between 9 mm and 13 mm. The head 216, which adjoins the neck 220, has a length between 30 mm and 80 mm, preferably between 50 mm and 70 mm. The overall length of the dishwashing brush 210 is between 160 mm and 300 mm, preferably 220 mm and 270 mm.

It is possible, however, for these given dimensions and/or the outer shapes and contours and the proportions of the individual elements of the dishwashing brush 210 to vary and, in particular, to be adapted to a specific application purpose. For example, it is possible to adapt the size, shaping and bristle covering of the head 216 to the environment which is to be cleaned or to configure the shape of the handle 212 particularly advantageously in ergonomic terms for specific hand sizes and/or hand positions.

In analogy to the previously described toothbrush 10, that side of the dishwashing brush 210 which is covered with bristles 218 will be referred to hereinbelow as the top side 226, although it is directed away from the user when the dishwashing brush 210 is being used. The side which is directed toward the user during use, for example the side which can be seen in FIG. 59, is consequently referred to as the underside 228.

In the case of the dishwashing brush 210 shown in FIG. 57, recesses 230 are formed in a lateral wall 232 of the handle body 213 and are arranged approximately along the longitudinal axis of the handle 212. Their recess openings 254 on the side portion 236 between the top side 226 and the underside 228 are of essentially undulating configuration.

The recesses 230, which are located opposite one another in relation to the longitudinal center plane L (see FIG. 59) of the dishwashing brush 210 are offset in relation to one another in each case on the two side portions 236. Adjacent recesses 230 of a respective side portion 236 are spaced apart from one another by webs 240. The webs have a width between 2 mm and 20 mm, preferably between 5 mm and 10 mm.

The shapes of the webs 240, and also the shapes of the recess openings 254 and/or of the recesses 230, can vary greatly. In addition to the undulating basic shapes shown in the side view of FIG. 57, trapezoidal and triangular (FIGS. 61 and 62), quadrilateral, in particular rectangular (FIGS. 63 and 64), pentagonal, hexagonal and octagonal basic shapes are thus also possible. Likewise conceivable are sickle-shaped curves and combined shapes, for example triangles or quadrilaterals with undulating boundary lines. It is, of course, also possible to use all the basic shapes of recesses 30, and the recess openings 54 thereof, which have been described in conjunction with different embodiments of handles 12 for toothbrushes 10.

In contrast to the previously described handles 12 for toothbrushes 10, however, the recesses 230 for the handles 212 for dishwashing brushes 210 are preferably formed on the side portions 236 of the walls 232, whereas the recesses 30 for the toothbrushes 10 are preferably open in the direction of the top side 26 and/or underside 28. These two types of arrangements for the recesses 230 are interchangeable with one another by rotation about the longitudinal axis of the handle 212 through approximately 90° in the circumferential direction. However, it is, of course, possible for both handles 212 for dishwashing brushes 210 and handles 12 for toothbrushes to be provided with both types of arrangement. Furthermore, it is also the case that more or less any arrangement of recesses 30, 230 which is offset circumferentially about the longitudinal axis of the handle 12, 212 is conceivable. In this case, either the recesses in the handle 12 are formed by movable lateral slides or the mold cavities are formed such that mold separation in the longitudinal direction of the handle body 213 is turned through 90°. In this case, use can be made of upright cores (in the manner analogous to FIGS. 41-44).

As can be gathered, in particular, from the sectional illustration in FIG. 58, the recesses 230 in the handle 212, after passing through the wall 232, open out into a cavity 242 on the inside of the handle. The cavity 242, like the handle body 213 itself, is elongate and extends more or less symmetrically about the longitudinal axis of the handle body 213. As can be seen in FIG. 58, the cavity 242 is rounded in the end regions of the handle 212 and is closed in each of the end regions. As an alternative, it is, of course, also possible for the cavity 242 to be open in the direction of at least one end region, as has already been mentioned in conjunction with handles 12 for toothbrushes 10.

In addition to the cavity 242 in the handle 212, a cavity 242 is likewise formed in the neck 220. On account of the neck 220 having smaller external dimensions than the handle 212, this cavity 242 has smaller dimensions than the cavity 242 in the handle 212. However, it is likewise elongate and extends more or less along the longitudinal axis of the neck 220. Like the cavity 242 in the handle 212, the cavity 242 in the neck 220 is also formed by opposite recesses 230—this time arranged in the neck 220.

In addition to the embodiment shown with two separate cavities 242, one in the handle 212 and one in the neck 220, it is also possible for these cavities 242 to be connected to one another and thus to form a single continuous cavity 242 which extends from the neck 220 into the handle 212. Whereas in the case of separate cavities 242 the arrangement of recesses 230 is interrupted between the handle 212 and the neck 220, the recesses 230, in the latter case, are lined up in a continuous row from the handle 212 over the neck 220.

As can likewise be seen from FIG. 58, the material thickness of the walls 232 which bound the cavities 242 is more or less constant in the circumferential direction. In the regions of the webs 240, it is 1 mm to 5 mm, preferably 1 mm to 3 mm.

The essentially constant material thickness of the walls 232 can also be gathered from the sectional illustration in FIG. 60. The section plane LX-LX, which provides for the illustration in FIG. 60, runs perpendicularly to the longitudinal axis of the handle 212, as depicted in FIG. 59. The rectangularly rounded outer cross section of the handle 212, on account of the more or less constant material thickness, is transferred in reduced-size form, to the cross section bounding the cavity 242. The wall 232, which is shown in cut-away form in FIG. 60, has a U-shaped cross section and is illustrated by hatching.

It can be gathered from the sectional illustration in FIG. 58 that, in the case of this embodiment of a dishwashing brush 210 according to the invention, the longitudinal extents of the recesses 230 and webs 240 which can be seen there in the handle 212 are oriented essentially at right angles to the longitudinal axis of the handle 212, whereas in the region of the neck 220 they are oriented essentially parallel to the longitudinal axis of the neck 220. As an alternative, the different shapes for the recesses 230 mean that other orientations in relation to the respective longitudinal axes are also possible.

Since, as has already been mentioned above, it is possible to vary the shape and the offset of recesses 230 in the circumferential direction of the handle 212 and of the neck 220, a wide variety of different shapes of web 240 and cavity 242 may be formed. It is preferable, however, to form recesses 230 which are offset through 180° in relation to one another in the circumferential direction, i.e. are located opposite one another along the longitudinal axes of the handle 212 and of the neck 220. The respectively greatest extent of their recess openings 254, as can be seen from the outside, is preferably oriented transversely, in particular at right angles, or more or less parallel to the longitudinal axis of the dishwashing brush 210 or the bristles 218.

In comparison with the previously described toothbrushes 10, the head 216 of the dishwashing brush 210, on account of being used differently, is inclined to a more pronounced extent in relation to the longitudinal axis of the neck 220 and/or of the handle 212. The angle enclosed by the longitudinal axis of the head 216 and of the longitudinal axis of the neck 220 is between 110° and 170°, preferably 135°. The bristles, which are arranged on the top side 226, project, on the neck side, more or less at right angles from the top side 226. The angle between the longitudinal axes of the bristles 218 and the longitudinal axis of the head 216 decreases in the direction of the free end of the head 216. Gradually varying orientations of the bristles 218, which are combined in clusters, achieves an improved cleaning effect for a cleaning movement which takes place at least more or less in the longitudinal direction of the head 216.

A scraping element 223 is arranged in the free end region of the head 216, on the underside 228, opposite the bristles 218. The scraping element 223, as can be seen in FIG. 58, has an essentially triangular cross section which tapers to a point in the direction of its free end region. An outer edge of the scraping element 223 which runs essentially at right angles to the longitudinal axis of the head 216 is referred to as the scraping edge 225. It serves for scraping off particularly stubborn dirt. As can be seen in FIG. 59, the scraping edge 225 of the scraping element 223 extends approximately over the entire width of the head 216.

FIGS. 61 and 62 show a further embodiment of a dishwashing brush 210 with a handle 212 according to the invention. The externally visible openings 254 of the recesses 230 on the handle 212 here are more or less triangular in basic shape. The two outer recesses 230 on the handle 212, as seen in the longitudinal direction, are adapted to the outer contour of the handle 212 and are rounded correspondingly. In the region of the neck 220, the openings 254 of the recesses 230 are approximately trapezoidal, their basic shape appearing to a viewer as being truncated or reduced in size in each case on the top side and underside in relation to the triangular basic shape of the recess openings 254 on the handle 212. The recess 230 formed at the head end of the neck 220 is likewise provided with a rounded opening 254.

As is shown in FIG. 62, the two side portions 236, which are located opposite one another in relation to the longitudinal center plane L of the dishwashing brush 210, are asymmetrical. Whereas the side which is oriented toward FIG. 61 in FIG. 62 has seven recesses 230, in which in each case the base of the triangular recess opening 254 is formed on the underside and is thus visible here, the opposite side has eight recesses 230, of which the tips of the triangular recess openings 254 are visible. In the case of this embodiment, it is thus not just the case that the recesses 230 are offset in relation to one another in respect of the longitudinal axis of a handle 212 and of the neck 220; rather, the orientation of their triangular recess openings 254 in relation to the underside 228 and/or the top side 226 differs on the two side portions 236 of the dishwashing brush 210.

FIGS. 63 and 64 illustrate a further embodiment of a dishwashing brush 210. The essentially rectangular openings 254 of the recesses 230 are essentially rectangular in basic shape both on the handle 212 and on the neck 220. Just in each case one recess 230 on the handle 212 and on the neck 220, this recess being positioned on the ring side in each case, is of partially rounded form. Whereas the longitudinal extents of the recess openings 254 on the handle 212 are oriented essentially at right angles to the longitudinal axis of the handle 212, the longitudinal extents of the recess openings 254 on the neck 220 run essentially parallel to the longitudinal axis of the neck 220. As can be gathered from FIG. 64, the two side portions 236 of the dishwashing brush 210 each have nine recesses 230 which, in turn, are offset in relation to one another, in respect of the longitudinal axis of the handle 212 and of the neck 220, in each case such that each recess 230 is respectively assigned a web 240 on the opposite side portion 236.

Those embodiments of dishwashing brushes 210 which are shown in FIGS. 57 to 64 are not provided with an embossing panel. However, it is possible to provide text, printing, labels and, if appropriate, also embossing either on the underside of the head 216 or on the walls 232 of the top side 226 and/or underside 228. The embossing is then produced as has been mentioned in conjunction with the toothbrushes 10.

In the same way as the previously described toothbrushes 10, it is also possible for the dishwashing brushes 210 to be produced wholly or partially from a hard and/or soft material. The hard materials used here are, in particular, PP, PET, PE, PS, SAN, PMMA, ABS, and preferably PP with a modulus of elasticity of 1000 N/mm² to 2400 N/mm², preferably 1300 N/mm² to 1800 N/mm². The soft materials used are LDPE, HDPE, PUR, TPE, preferably TPE with a Shore A hardness of below 90. Embodiments with a number of components of hard and/or soft materials are possible here, in particular in the region of the webs 240. The webs 240 may consist of hard material or soft material or of a combination of hard and soft materials. The softer the materials used for the webs 240, the greater is the level of flexibility which allows the walls 232 to move along their surface normals. In the cases in which a number of components are used, the walls 232, which extend continuously over the top side 226 and the underside 228, preferably serve as distributor channels for the individual components. It is likewise possible for the entire brush body 214 of the dishwashing brush 210 to be molded from a hard material or a combination of hard material and soft material and for the additionally formed cavities 242 and/or recesses 230 to be filled partially, or even wholly, with soft material. This is, of course, likewise possible for the handles 12 of toothbrushes 10. The act of completely filling the cavities 242 gives rise, in turn, to a closed handle shape without any openings; this gives a smooth outer surface which is interrupted only by transitions between hard and soft components. The hard component thus forms a kind of skeleton which is embedded in soft material, and the cavity 242 according to the invention, and the recesses 230 which shape the same, in the interior of the handle 212 are filled at least partially with soft material. Use is preferably made in this case of a transparent or translucent soft material, for the purpose of indicating to the user material weakenings in the hard material which are possibly functional (e.g. flexible), but are enclosed by soft material.

Like the toothbrushes 10, the dishwashing brushes 210 are also preferably produced by injection molding. The injection molds 70 used here are likewise preferably in two parts and, in a manner analogous to the mold halves 72.1, 72.2 shown in FIGS. 41 to 44, have finger elements 74 which form the recesses 230 and the cavities 242 on the dishwashing brush 210. An injection point (not shown) is preferably located in the ring-side end region of the handle 212, on the underside 228 of a wall 232 extending continuously over the handle 212. As has already been mentioned in conjunction with the cavity 42 of toothbrushes 10, the cavities 242 of dishwashing brushes 210 may also be provided with additional ribbing, in order to provide the hollow handle 212 with additional stability.

In summary, it should be mentioned once again that all the features described in respect of design and production, and also the associated advantages, are transferable both to bodycare products such as wet shavers, mascara brushes, in particular to toothbrushes 10, and to brushes such as, in particular, dishwashing brushes 210. In the case of both items 10, 210, in each case the handle 12, 212 and the neck 220 are in the form of a stable hollow body which can be produced particularly easily with reduced material costs.

The invention claimed is:

1. A handle adapted for a toothbrush comprising:
   an elongate handle body including a cavity at least partially enclosed by a wall, the wall having a plurality of recesses, wherein
   the elongate handle body is formed of one piece,
   the recesses pass through the wall, are offset in relation to each other, and open into the cavity,
   at least two circumferentially offset recesses are arranged on opposite sides of the elongate handle body so as to be offset by substantially 180° in a circumferential direction,
   at least two longitudinally offset recesses are offset from each other in the longitudinal direction of the elongate handle body and are spaced apart from one another by one or more webs of the wall, and
   the one or more webs have an essentially, identical material thickness and/or extent in the longitudinal direction of the elongate handle body.

2. The handle of claim 1, wherein
   the recesses define a rectilinear through-passage through the cavity.

3. The handle of claim 1, wherein
   at least two rectilinear recesses are formed on a same side of the elongate handle body, are arranged along a rectilinear line, and are each offset in the longitudinal direction of the elongate handle body in relation to recesses which are formed in the opposite side.

4. The handle of claim 1, wherein the cavity is enclosed at least on one side of the longitudinal direction of the handle body.

5. The handle of claim 1, wherein the recesses and/or one or more cross sections of the cavity are oval, circular, halfmoon-shaped, sickle-shaped, square, polygonal, and/or formed according to figures and/or animals.

6. The handle of claim 1, wherein the recesses have different shapes and/or dimensions from each other.

7. The handle of claim 1, wherein the recesses have the same shape and are adapted in dimension, in accordance with their positions on the handle body, to a circumference of the handle body.

8. The handle of claim 1, wherein the cavity is elongate, and the longitudinal axis of the cavity extends coaxially in relation to the longitudinal axis of the handle body.

9. The handle of claim 1, wherein the handle body has a rounded outer contour, which includes a panel for applying text laterally on at least one side.

10. A handle configured for use with brush products comprising:
an elongate handle body including a cavity at least partially enclosed by a wall, the wall having a plurality of recesses, wherein
the elongate handle body is formed of one piece,
the recesses pass through the wall, are offset from each other in a longitudinal direction of the elongate handle body, and open into the cavity,
at least two circumferentially offset recesses are arranged opposite sides of the elongate handle body so as to be offset by substantially 180° in a circumferential direction,
at least two longitudinally offset recesses are offset from each other in the longitudinal direction of the elongate handle body and are spaced apart from one another by one or more webs of the wall, and
the one or more webs have an essentially identical material thickness and/or extent in the longitudinal direction of the elongate handle body.

11. The handle of claim 10, wherein the recesses define a rectilinear through-passage through the cavity.

12. The handle of claim 10, wherein at least two rectilinear recesses are formed on a same side of the elongate handle body, are arranged along a rectilinear line, and are each offset in the longitudinal direction of the elongate handle body in relation to recesses which are formed in the opposite side.

13. The handle of claim 10, wherein the cavity is enclosed at least on one side of the longitudinal direction of the handle body.

14. The handle of claim 10, wherein the recesses and/or one or more cross sections of the cavity are oval, circular, halfmoon-shaped, sickle-shaped, square, polygonal, and/or formed according to figures and/or animals.

15. The handle of claim 10, wherein the recesses have different shapes and/or dimensions from each other.

16. The handle of claim 10, wherein the recesses have the same shape and are adapted in dimension, in accordance with their positions on the handle body, to a circumference of the handle body.

17. The handle of claim 10, wherein the cavity is elongate, and the longitudinal axis of the cavity extends coaxially in relation to the longitudinal axis of the handle body.

18. The handle of claim 10, wherein the handle body has a rounded outer contour, which includes a panel for applying text laterally on at least one side.

19. The handle of claim 10, wherein the elongate handle body and/or the one or more webs is/are produced from a hard material, a soft material, or a combination of hard and soft materials.

20. A method of producing a handle adapted for a brush product having an elongate handle body with a cavity at least partially enclosed by a wall, the wall having a plurality of recesses, wherein the elongate handle body is formed of one piece and the recesses pass through the wall, are offset in relation to each other, and open into the cavity, the method comprising:
injecting plastic, in an injection-molding process, into a continuous cavity defined by an injection mold; and
bounding at least a portion of the cavity with a plurality of finger elements which, in a closed state of the injection mold, are in at least partial sealing contact with each other to prevent throughflow of plastic and which define, in the finished handle, the recesses and the cavity in the handle body.

21. The method of claim 20, wherein the finger elements taper conically at an angle between 5° and 15°.

22. The method of claim 20, wherein the injection mold includes a first mold half and a second mold half both configured to be separable in the demolding direction, and
the finger elements are fixed in the mold halves such that they extend in the demolding direction.

23. The method of claim 22, wherein the finger elements are formed in a comb-like configuration in the first mold half and the second mold half so that the finger elements are offset in relation to each other, such that when the first mold half and the second mold half are put together, the finger elements of the first mold half engage between the finger elements of the second mold half and are in contact therewith.

24. The method of claim 22, wherein at least one of the mold halves includes between 2 and 10 ejectors that lift a solidified plastic part out of the at least one of the mold halves.

25. The method of claim 22, wherein at least one of the mold halves includes between 2 and 5 ejectors that lift a solidified plastic part out of the at least one of the mold halves.

26. The method of claim 20, wherein at least one of the plurality of finger elements is configured to be a movable slide or core.

27. The method of claim 20, wherein at least two of the plurality of finger elements have different cross-sectional shapes and dimensions along the longitudinal axis from each other.

28. The method of claim 20, further comprising:
producing the handle body and a plurality of webs from a hard material, a soft material, or a combination of hard and soft materials.

29. The method of claim 28, further comprising:
injecting the hard material and/or the soft material in a single injection point at a free end region of the handle which is to be formed.

30. The method of claim 28, wherein
the finger elements are at least partially moved into the cavity prior to a further material being injected.

31. The method of claim 20 further comprising:
filling the cavity defined by the interior of the handle, at least partially, with a soft material.

32. The method of claim 20 further comprising:
forming a text panel on a side surface of the toothbrush by means of one or more lateral slides, the text panel covering over and/or dividing up a mold-separating line of the handle.

33. The method of claim 20, wherein
the finger elements taper conically at an angle of substantially 10°.

34. A method of producing a toothbrush having an elongate handle body including a cavity at least partially enclosed by a wall, the wall having a plurality of recesses, wherein the elongate handle body is formed of one piece and the recesses pass through the wall, are offset in relation to each other, and open into the cavity, the method comprising:
producing a handle by the method of claim 20;
adjoining the handle with a neck and a head arranged on the neck opposite the handle;
producing a toothbrush body integrally with the handle, in an injection-molding process, from a hard material or a soft material or a combination of hard and soft materials, wherein
the head is covered with bristles on a top side.

* * * * *